United States Patent
Marosan

(12) 
(10) Patent No.: US 11,960,747 B2
(45) Date of Patent: Apr. 16, 2024

(54) MOVING DATA IN A MEMORY AND COMMAND FOR MEMORY CONTROL

(71) Applicant: Blueshift Memory Ltd, London (GB)

(72) Inventor: Peter Marosan, London (GB)

(73) Assignee: BLUESHIFT MEMORY LTD, London (GB)

( * ) Notice: Subject to any disclaimer, the term of this patent is extended or adjusted under 35 U.S.C. 154(b) by 274 days.

(21) Appl. No.: 17/439,203

(22) PCT Filed: Mar. 13, 2020

(86) PCT No.: PCT/GB2020/050656
§ 371 (c)(1),
(2) Date: Sep. 14, 2021

(87) PCT Pub. No.: WO2020/183200
PCT Pub. Date: Sep. 17, 2020

(65) Prior Publication Data
US 2022/0197533 A1 Jun. 23, 2022

(30) Foreign Application Priority Data
Mar. 14, 2019 (GB) ...................... 1903513

(51) Int. Cl.
*G06F 12/00* (2006.01)
*G06F 3/06* (2006.01)
(52) U.S. Cl.
CPC .......... *G06F 3/0647* (2013.01); *G06F 3/0604* (2013.01); *G06F 3/0659* (2013.01); *G06F 3/0673* (2013.01)

(58) Field of Classification Search
CPC .... G06F 3/0604; G06F 3/0647; G06F 3/0673; G06F 3/0659
See application file for complete search history.

(56) References Cited

U.S. PATENT DOCUMENTS 6,292,853 B1    9/2001  Takahashi
11,422,726 B1*  8/2022  Jo .......................... G06F 3/067
(Continued)

FOREIGN PATENT DOCUMENTS

EP   2601586 A0    6/2013
WO   2012168099 A1  12/2012
(Continued)

*Primary Examiner* — John A Lane
(74) *Attorney, Agent, or Firm* — COATS & BENNETT, PLLC

(57) ABSTRACT

A memory unit (23,24) is proposed for a computer system having a processing unit and a data bus for transferring data between the processing unit and the memory unit. The memory unit (23,24) stores data at a plurality of locations ("data items") in a logical memory space (32), such that each data item has an address given by at least one index variable. In addition to read and write commands, the memory unit is operative to receive a shift command in a predefined format and including shift data which indicates a source address in the logical space. Upon receiving the command, the memory unit is operative to recognise it as a shift command and accordingly perform a predefined shift function comprising (i) using the source address to identify a portion of data in the memory space and (ii) writing that portion of data to a different location in the memory space. Thus, the portion of data can be shifted within the memory space without a need to transfer the portion of data along the bus.

17 Claims, 26 Drawing Sheets

(56) References Cited

U.S. PATENT DOCUMENTS

| | | | |
|---|---|---|---|
| 2004/0049649 A1 | 3/2004 | Durrant | |
| 2009/0089515 A1 | 4/2009 | Michalak et al. | |
| 2011/0116328 A1 | 5/2011 | Gupta et al. | |
| 2013/0282974 A1 | 10/2013 | Joisha | |
| 2014/0068170 A1 | 3/2014 | Anderson | |
| 2014/0297985 A1 | 10/2014 | Graefe et al. | |
| 2015/0089160 A1 | 3/2015 | Jang et al. | |
| 2015/0278132 A1 | 10/2015 | Leijten | |
| 2023/0137938 A1* | 5/2023 | Yang | G06F 3/0647 711/163 |

FOREIGN PATENT DOCUMENTS

| | | |
|---|---|---|
| WO | 2013002772 A1 | 1/2013 |
| WO | 2013115779 A1 | 8/2013 |
| WO | 2013130109 A1 | 9/2013 |

\* cited by examiner

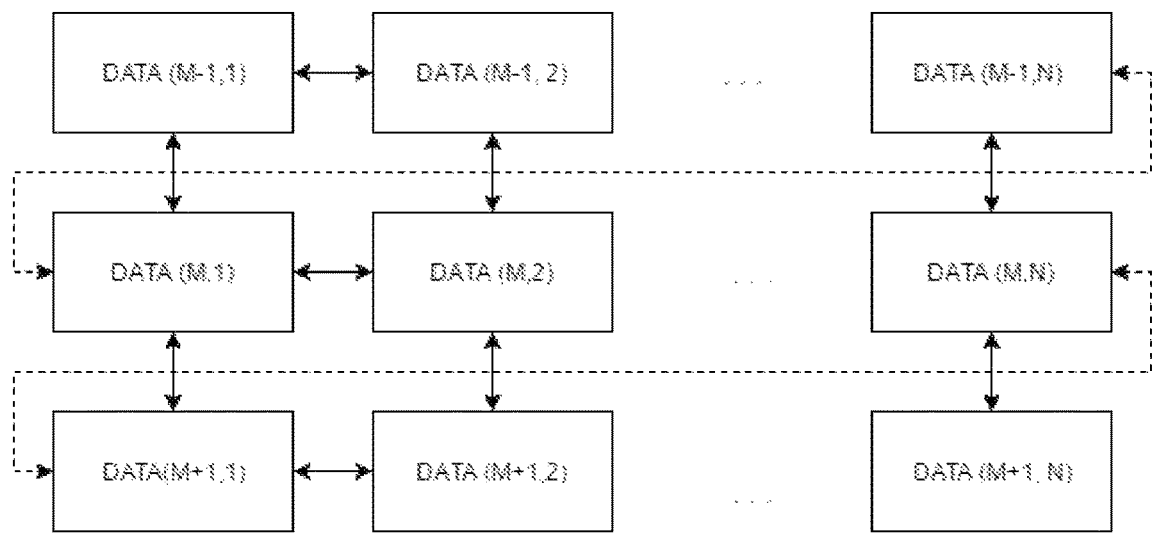
Fig. 8
| A | B | C |
|---|---|---|
| D | E | F |
| G | H | I |
Fig. 9
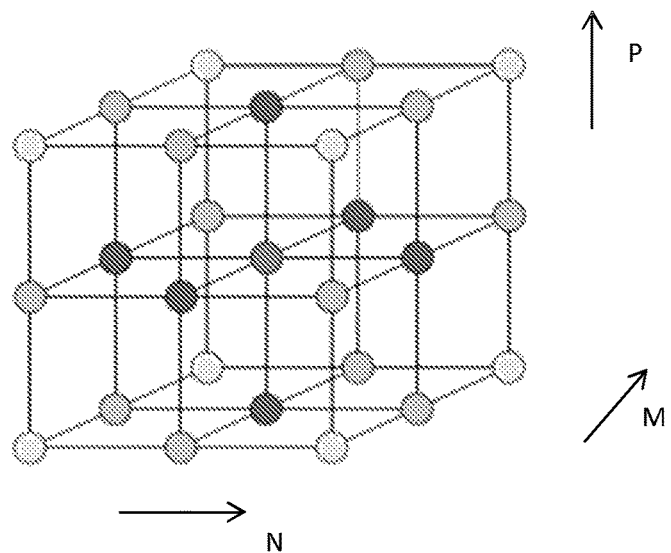
Fig. 10

| A | B | C | D | E | F | G | H | I |

N-2　N-1　N　N+1　N+2　N+3　N+4　N+5　N+6

(a)

N-2　N-1　N　N+1　N+2　N+3　N+4　N+5　N+6

| A | B | C | C | C | C | D | E | I |

| C | D | E | E | E | F | G | H | I |

PRIOR ART

| A(i-1,j-1) | A(i-1,j) | A(i-1,j+1) | A(i-1,j+2) |
| A(i,j-1) | A(i,j) | A(i,j+1) | A(i,j+2) |
| A(i+1,j-1) | A(i+1,j) | A(i+1,j+1) | A(i+1,j+2) |

MOVING DATA IN A MEMORY AND COMMAND FOR MEMORY CONTROL

1) DESCRIPTION FOR DISCLOSURE 1

Field of the Invention

The present invention relates to a memory unit, such as a single integrated circuit. It further relates to the operating method implemented by the memory unit and to a computer system incorporating the memory unit.

Background of the Invention

A conventional digital computer system according to the von Neumann architecture includes at least one central processing unit (CPU) including a processor, a cache memory and a control unit; a memory for storing both data and instructions; external mass storage; and input and output mechanisms. The CPU(s) and memory are connected by a bus. A well-known problem with such systems, referred to as the von Neumann bottleneck, is that the throughput (data transfer rate) through the bus between the CPU(s) and the memory is limited. This seriously limits the effective programming speed when one of the CPUs is required to perform minimal processing on large amounts of data, since the CPU is continually forced to wait for needed data to be transferred to or from the memory. The severity of the problem is gradually increasing, since CPU performance, the typical number of CPUs in a computer system, and the memory size are increasing much faster than bus throughput.

An example of the problem is illustrated in FIG. 1, where a CPU 1 and memory 3 are connected by a data bus 2. FIG. 1 illustrates a read operation which is performed by the CPU 1 to read N data elements from the memory 3: it has to send N read commands to the memory 3 and await the replies. If it is desired to insert data into an array in the memory 3, or remove an item from the array, it is necessary to move the whole array from the memory to the CPU and then write the data back with a slightly different address. If there are N words of data in the array, all of them must be moved through the data bus between the CPU and the memory. This is an energy-consuming step and takes a time directly proportional to the size N of the array. Typically, different storage techniques are used for handling static data (i.e. data which, once written to the memory, is expected not to be modified, or at least not for a long time) and dynamic data (i.e. data written to the memory and which is expected to be changed relatively soon). Current strategies to avoid the problem use complex data structures to handle the dynamic data, such as linked lists, heaps, index or hash tables, trees etc. All of these techniques are slower than static data handling (i.e. operations in which the data in the memory is not changed), because of the time taken by the bus to communicate the data between the CPU and memory.

SUMMARY OF THE INVENTION

The present invention aims to provide a new and useful memory unit for a computer system having a processing unit (e.g. a CPU) and a bus for transferring data between the processing unit and the memory unit.

The invention further aims to provide a new and useful operating method for a memory unit. It further aims to provide a new and useful computer system incorporating the memory unit.

In general terms, the invention proposes, in a first aspect, that a memory unit stores data at a plurality of locations ("data items") in a logical memory space, such that each data item has an address given by at least one index variable. The memory unit is operative to receive a command (a "shift command") in a predefined format and including shift data which indicates an address in the logical space (a "source address"). Upon receiving the command, the memory unit is operative to recognise it as a shift command and accordingly perform a predefined "shift function" comprising (i) using the source address to identify a portion of data in the memory space and (ii) writing that portion of data to a different location in the memory space.

Thus, the memory unit is operative to perform a predefined command to move an amount of data within the memory space, without the data having to pass through the bus. This makes it possible for a CPU of a computer system including the memory unit to perform certain, relatively-simple computing operations without encountering the bottleneck problem, by sending shift commands to the memory unit. The operations include inserting data elements into a data array and removing data elements from a data array.

Preferred embodiments of the invention are dramatically faster than conventional systems for data-intensive insertion and deletion of data elements into/from data arrays, since they eliminate the need for unnecessary communication between the memory and the CPU. CPU time is not wasted, so the power of the CPU can be reserved for more complex calculations.

Furthermore, the embodiments allow data to be moved in a memory with preservation of the data order. This means that the embodiments can use a static data structure instead of the complex and uncacheable dynamic structures of the known systems described above.

As well as speeding up the overall computer system, the present invention makes possible a reduction in energy consumption, so a computer system according to the present invention can generate less heat.

Furthermore, its simplicity gives algorithmic advantages over the known solutions to the bottleneck problem. This is because the same methods can be used for handling static and dynamic data and these methods are less complex than the methods used in conventional data handling. Furthermore, the process of coding algorithms for data handling can be simpler, since the data structures are simpler. Thus, the development, testing, compiling and running of applications can be faster also.

Furthermore, the invention makes possible continuous garbage collection (that is, the process of reclaiming portions of the memory space which are no longer storing useful data (that is, they are only storing "waste data") and making them available for re-use), so the high level programming languages do not have to pause while this is performed. For example, following any memory operation (or at least any memory operation having one or more predefined characteristics, such as operations which cause more than a predetermined amount of waste data to be stored in the memory unit), there may be a compaction operation of compacting the valuable data. In this case, after the compaction operation all data items storing valuable data may be included within a contiguous region of the address space which does includes substantially no data items which store waste data.

Furthermore, the improved garbage collection makes it possible, in the case that the memory is one which uses a memory refresh operation, to turn off a memory refresh operation in unused memory blocks (that is, groups of one or more data cells which store waste data), while continuing to perform it in memory blocks which are storing valuable data. This results in an additional energy saving. For example, if there is a garbage collection such that no data items outside a contiguous region of the logical address space are storing valuable data, then refresh operations may be disabled for the data items outside that contiguous region.

This concept provides, in fact, an independent second aspect of the invention, which is freely combinable with the first aspect of the invention described above, according to which the invention provides a memory unit which is operative to perform memory refresh operations on a memory space of the memory unit (e.g. periodically, without receiving a specific instruction to), to receive a disable instruction indicating at least one location in a memory space of the memory unit and, upon receiving the disable instruction, to discontinue memory refresh operations in respect of the indicated at least one location in the memory space. Memory refresh operations in respect of other locations in the memory space are not interrupted. The memory space is preferably defined by physical memory cells of a type which default to a certain state after a pre-known period of time if the memory refresh operation is not performed.

This in turn provides a further advantage, that when an area of the memory space which is not currently being used to store valuable data (i.e. one which is not currently being refreshed) is designated for use as a memory block to store valuable data, it begins with a pre-known state (i.e. all data cells within it are set to zero). This means that it is not necessary to perform a time-consuming communication between the CPU and the memory unit through the bus to create a clear memory block.

Note that as well as transferring data within the memory of a processing unit, the method according to the first aspect of the invention may be used to transfer data from one or more first memory units (e.g. volatile memories) to one or more second memory units (e.g. slower non-volatile data storage devices), where the data exchange would make conventional data handling slow.

In preferred embodiments, the index variable(s) include a primary index variable. If there is only one index variable, we define "a sequence of data items" as a set of data items for which the (primary) index variable takes consecutive values. If there are multiple index variables, a "sequence of consecutive data items" is the set of data items for which the primary index value takes consecutive values and each index variable other than the primary index variable has the same index value. A sequence of data items has a "start" which is the value of the primary index variable which is lowest among the sequence of data items. Similarly, the sequence of data items has an "end" which is the value of the primary index variable which is highest among the sequence of data items.

The source address includes a primary index value and the portion of data may comprise, or consist of, a sequence of data items. The source address may be the address of a data item at one end of this sequence.

For example, the source address may be the address of the data item at the start of the sequence (i.e. the address of the one of the sequence of data items which has the lowest value of the primary index variable). In this case, the address is referred to as a "source start address". Note that in other embodiments of the invention the address could equivalently be the address of the data item at the end of the sequence (i.e. the address of the one of the sequence of data items which has the highest value of the primary index value). These embodiments are not discussed in detail here, but the inventive concept is to be understood as including both these possibilities.

In principle, the shift command could specify that a predefined amount of data is to be moved by a predetermined distance (and different types of shift command may be defined associated with different data amounts/shift distances). However, more preferably, the shift data further includes supplementary shift data specifying at least one of (i) the amount of data which is to be moved and (ii) the different location in the memory space. In different forms of the invention the supplementary data may take different forms.

For example, the shift data may specify the amount of data which is to be moved by including a size value which specifies that amount explicitly. Alternatively, the command data may specify the amount of data by including a second address, such as a source end address. In this case, the amount of data which is to be moved may be equal to the number of data items between the source start address and the source end address (e.g. including the data items at both those two addresses).

Similarly, the command data may specify the different location in the memory explicitly by including a target address. For example, the target address may be the start address (or the end address) of the region of the memory to which the portion of data is to be moved. Alternatively, the different location may be specified with reference to the source address, e.g. as a step length (shift length) which indicates the spacing between the source address and the target address.

The invention may be expressed as a memory unit, or alternatively as a method performed by the memory unit in operation (an "operating method"), or alternatively as a computer system incorporating the memory unit.

The memory unit preferably consists of a single integrated circuit (i.e. a single body of semiconductor material, typically embedded in a resin matrix and typically defining electrical pathways between contacts of the semiconductor body to positions external to the resin matrix), although in principle it could include a plurality of integrated circuits (e.g. ones which collectively define a collective memory space), which may optionally be connected directly rather than via a bus. As for conventional memory units, the integrated circuit(s) are each operative, upon receiving a read command specifying a read address in the memory space, to transmit out of the integrated circuits, one or more data items at the read address. Further, the integrated circuit(s) are each operative, upon receiving a write command specifying (i) a write address in the memory space and (ii) one or more data elements, to write the data elements to data items at the write address.

BRIEF DESCRIPTION OF THE DRAWINGS

Embodiments of the invention will now be described for the sake of example only with reference to the following drawings in which:

FIG. 8 shows two extra data pipes in the two-dimensional array of data items of FIG. 7;

FIG. 9 shows the data elements (values) contained in nine data items in a two-dimensional array in the memory unit of FIG. 3;

FIG. 10 shows a three-dimensional array of data items in the memory unit of FIG. 3;

FIG. 13, which is composed of FIGS. 13(a) and 13(b), shows a row shift function performed by the memory unit of FIG. 3;

FIG. 14, which is composed of FIGS. 14(a) and 14(b), shows another primitive +1 data shift function performed by the memory unit of FIG. 3;

FIG. 15, which is composed of FIGS. 15(a) and 15(b), shows a composite data shift function performed by the memory unit of FIG. 3;

FIG. 16 shows another composite data shift performed by the memory unit of FIG. 3;

FIG. 17, which is composed of FIGS. 17(a) and 17(a), shows a composite shift function in a two-dimensional matrix of data elements in the memory unit of FIG. 3;

FIG. 36 illustrates a first data storage operation performed by the embodiment of FIG. 33;

FIG. 37 illustrates a second data storage operation performed by the embodiment of FIG. 33;

FIG. 38 illustrates a third data storage operation performed by the embodiment of FIG. 33;

DETAILED DESCRIPTION OF THE EMBODIMENTS

Figure 1:
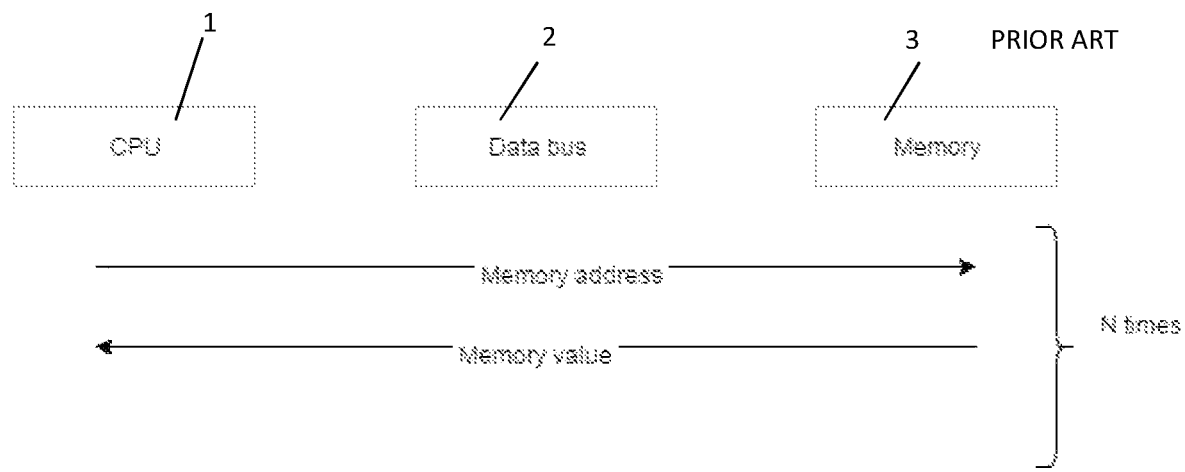
FIG. 1 shows schematically a read operation in a conventional computer system.
Figure 2:
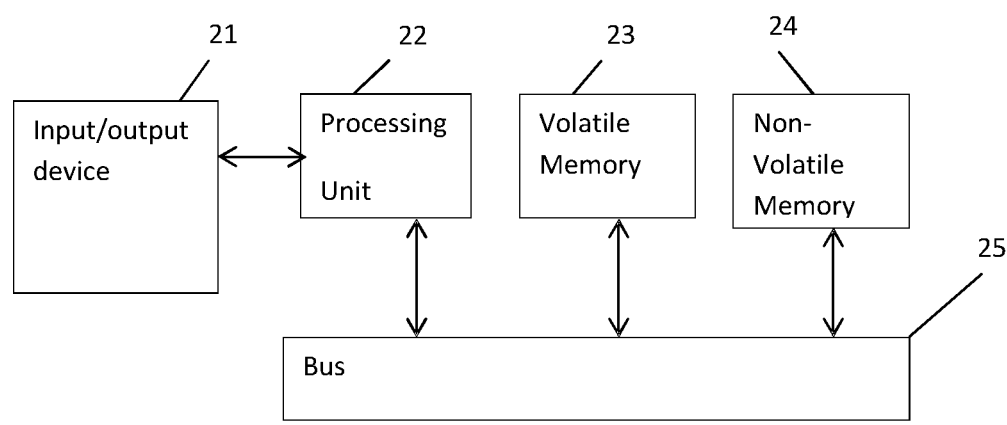
FIG. 2 is a schematic diagram of a computer system which is an embodiment of the invention.

One embodiment of the invention is a computer system shown in FIG. 2. As in a conventional computer system, the computer system of FIG. 2 includes at least one input/output device 21 (for simplicity, only one is shown in FIG. 1) and at least one processing unit 22 (CPU). Again, for simplicity, only one is shown in FIG. 1, but the embodiment may have any number of processing units 22. The computer system also includes one or more memory units of the same or different types. As depicted in FIG. 1, it includes a volatile memory 23 and a non-volatile memory 24. Communication between the processor(s) 22 and the memory units 23, 24 is via a bus 25. Messages between the processor(s) 22 and the memory units 23, 24 are typically sent in a format including device identification data specifying which of the devices 22, 23, 24 they are intended for. Each device 22, 23, 24 is capable of recognising messages intended for it and extracting a command or other data from them.

Figure 3:
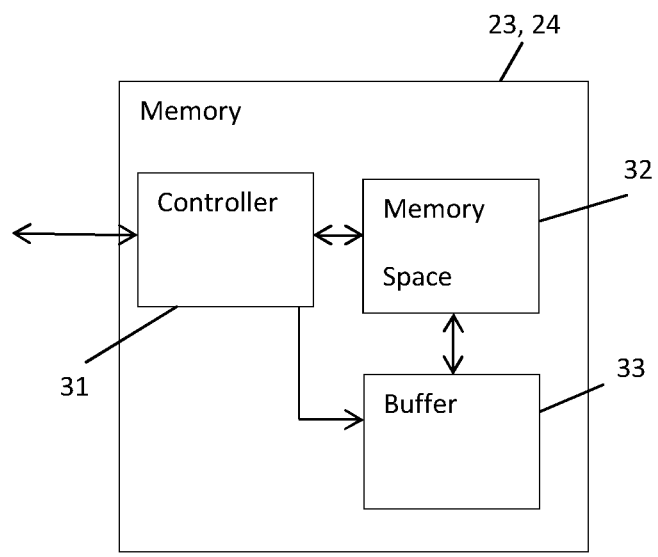
FIG. 3 shows the construction of a memory unit in the computer system of FIG. 2.

Each of the memory units 23, 24 has the general structure shown in FIG. 3 and includes a controller 31, memory components 32 (physical memory cells) defining a memory space and optionally buffer components 33 (physical memory cells) defining a buffer.

As in a conventional computer system, each of the memory units 23, 24 is capable of performing a read command from the memory space 32. That is, one of the processing unit(s) 22 can send a read command to a memory unit 23, 24 including an address in the memory space 32 and the controller 31 of the memory unit 23, 24, upon receiving the read command (and determining that the read command is directed to it), the memory unit 23, 24 extracts the data stored at the address in the memory space 32 and replies by sending a message addressed to the same processor 22 containing the extracted data.

Furthermore, as in a conventional computer system, each of the memory units 23, 24 is capable of performing a write command. That is, one of the processor(s) 22 can send a write command to a memory unit 23, 24 including an address in the memory space 32 defined by the memory unit and including data to be stored and the memory unit 23, 24, upon reading the write command (and determining that the write command is directed to it), stores the data at the specified address in the memory space 32.

However, the memory units 23, 24 of the embodiment have, in addition the ability to perform shift commands, explained below.

1. Basic Definitions

First we define the terminology used later in the description.

1.1 Definition: Data Item

The term "data item" means the part of the memory space 32 (or the buffer 33, if any) which stores a respective "data element". In different embodiments of the invention, the data element may be a single bit, a byte, a word (such as a word which is 2, 4, 8 bytes of some other number of bytes; or such as a quantum bit/word), or a set of consecutive words.

As noted above, each data item in the memory space 32 (or the buffer 33) is physically implemented by one or more physical memory cells. The embodiment may be implemented using any of multiple different physical memory technologies and the memory cells differ in type from one technology to another. In particular, the data items in the memory space may be implemented during different physical memory technologies from each other. Alternatively or additionally, the data items in the memory space 32 may be implemented using a different physical memory technology (-ies) from the data items in the buffer 33.

The controller 31 is operative, in respect of each data item, to control it selectively to perform three functions: storing data it receives; causing the data it stores to be output from the memory unit; and writing the data it stores to another of the data items.

1.2 Definition: Block

The term "block" means a collection of consecutive data items, or a slice or sub-set of a data item. Thus a block can be bigger or smaller than a data item. The blocks considered here are usually chosen by consideration of the physical storage mechanism, i.e. according to the solutions and limitations of data storage technology.

1.3 Definition: Data Pipe

A data pipe is a logical connection between two data items along which a data element can be passed. Thus, the data pipe may be regarded as equivalent to a special wire. The data pipe is implemented by physical components discussed below. According to which technology is used for the data storage, the data pipe takes different forms (e.g. logical/electric/electronic connections or circuits), but its functionality is the same: it allows one of the data items to be write the data it stores to the data item at the other end of the data pipe.

The write function is typically performed in response to a clock signal. The clock too varies according to the technology. In some realisations, only one of the data items receives the clock signal, or both may and optionally the pipe may receive it too.

Figure 4:
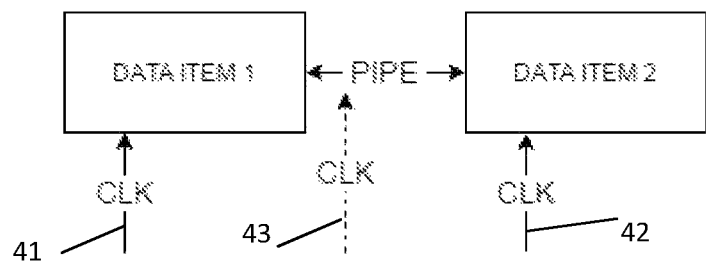
FIG. 4 illustrates the transfer of data between two data items in the memory unit of FIG. 3.

The data pipe is usually symmetrical between the data items, so both of the data items can selectively (i.e. depending on the commands they receive) write their respective content into the other one. This is illustrated in FIG. 4, where each of two data items ("DATA ITEM 1" and "DATA ITEM 2") are represented as respective rectangular boxes, the data pipe between them is represented as a double-headed arrow and the dashed arrow indicates that the clock signal to the data pipe is optional. The clock signals are transmitted by clock lines 41, 42 and (optionally) 43.

In some embodiments the physical memory used to implement the two data items may use different data storage technology (e.g. DATA ITEM 1 may be implemented as a DRAM and the DATA ITEM 2 may be implemented as a SRAM), so the implementation of the data pipe could depend on the technology used to implement the data items. Within a single memory unit, there may be multiple types of data pipe, with each type of data pipe being for transmitting data between data items which are implemented using a corresponding pair of physical technologies (e.g. one type of data pipe for connecting a DRAM data item to another DRAM data item (i.e. a DRAM-DRAM connection); another type of data pipe for a DRAM-SRAM connection; another type of data pipe for a SRAM-DRAM connection; and another type of data pipe for a SRAM-SRAM connection). However, the logical functionality of all these types of data pipe is the same.

Many of the later figures of this text omit the clock wires for simplicity (and because they are in different in every cell technology), but the clock wires are nevertheless important for the data copying process.

1.4 Definition: Copy

The term "copy" means that a data item writes its value (i.e. the data element it is storing) into another data item.

We use the notation $s(x, t)$ to means the state of the data item x at time t. Thus, if data item 1 writes its value at time t into data item 2, $s(2, t+1)=s(1, t)$.

Note that t is defined in logical terms, such that the time taken for a copying operation between two data items takes one unit of t. On a physical level, the relationship between one unit of t and the number of clock ticks depends upon the technology used to implement the memory cells. For some technologies, one unit of t is 1 clock tick; for others it is more.

1.5 Definition: Data Exchange

In some embodiments, the data stored in two data items can be exchanged. So, to use the same notations:

$$s(1,t+1)=s(2,t) \text{ and } s(2,t+1)=s(1,t)$$

Depending on the physical memory cell implementation, it may not be possible to perform an exchange in one step. Instead, it may take n steps (where n is an integer greater than one), so that it is only completed at a time $T=t+n$. In this case, $$s(1,T)=s(2,t) \text{ and } s(2,T)=s(1,t)$$

1.6 Definition: Neighbour

We call two data items "neighbours" if there is a data pipe (or, as explained in more detail below, a buffer) between them. Any given data item may have $0, \ldots, K$ neighbours where K is a non-negative integer.

During a copy operation, the value stored by any given data item is set by (only) one of its neighbours. In the embodiments considered in detail here, the value stored by a given data item is copied to at most one of its neighbours; however, other embodiments are possible in which a data item can be controlled to copy its value into any number of its neighbours, either in a single step or in multiple steps. Note that, as mentioned above, the data element (value) stored in a given data item may be composed of smaller units of data, e.g. words contain bits. In this case, during a copy operation from a first data item to a second data item, each of the smaller units of data are copied from the first data time to the same respective position within the second data item. For example, if the data element is a word and every word is composed of bits, the data pipe connects every bit of the word to the same respective bit of in the neighbouring data item. For example, if a data element n, which stores a word (or any other multi-bit data element), is connected by data pipes to data elements n−1 and n+1, then W(n, m) is connected to W(n−1, m) and W(n+1, m). Here n is an address in the memory, m is the position of a bit (or other simpler data element) inside a word and W(n,m) is the bit at memory address n.

1.7 Definition: Dimension

Typically, as in conventional systems, the logical addressing of the data units and the physical implementation of the memory cells, is based on one or more "dimensions". The positions of the data pipes (i.e. the decision of which data items to connect by data pipes) are also preferably selected according to these dimensions. The following definitions will make this terminology clear.

1.8 Definition: Row (or Column) (Dimension 1)

Figure 5:
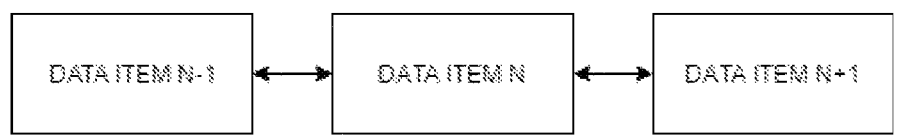
FIG. 5 illustrates transfer of data between three data items in the memory unit of FIG. 3.

If each given data item has two respective neighbours (or if a given shift function as defined below only uses the connections to two neighbours), we will call them a "row". This is illustrated in FIG. 5. Although FIG. 5 shows a row of only three data items, in other embodiments there may be any number of data items in a row, connected pairwise by data pipes.

To simplify the later diagrams, they mostly omit the arrows (pipes) between data items, but it is to be understood that when two data items are illustrated by respective boxes sharing an edge, there is a data pipe between these neighbours.

In FIG. 6(a), the addresses of five data items are shown within the corresponding rectangles, so that for example, the data item with address N can copy its value into the (N−1)-th or/and (N+1)-th data items (i.e. the data items with address N−1 and N+1), using a corresponding data pipe. The variable N is referred to as an "index variable", which can takes a value called an "index value". In the one-dimensional case there is only one index variable. Below we discuss situations in which there are several index variables. In general, the number of index variables is an integer n (greater than or equal to one) which is the dimensionality of the memory space and one index variable is called the primary index variable.

In FIG. 6(b), the respective values (A to E) stored by the five data items are shown. In the following diagrams the letter N (and sometimes M and P) are used within a rectangle representing a data item to indicate the address (index value(s)) of the data item, whereas other letters are used to indicate a value (data element) stored in a given data item.

1.9 Definition: Matrix (Dimension 2)

Figures 6, 7:
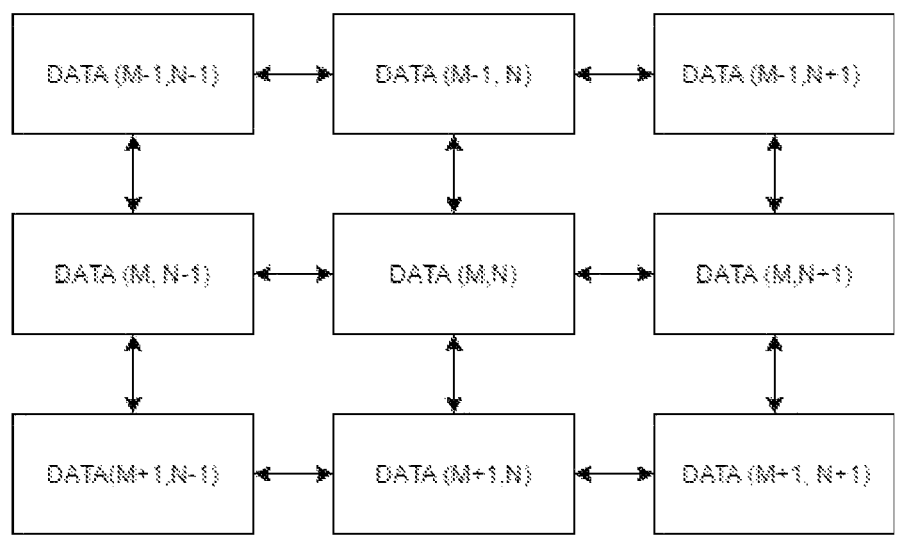
FIG. 6 is composed of FIG. 6(a) which shows the addresses of five data items in a one-dimensional array in the memory unit of FIG. 3 and FIG. 6(b) which shows the data elements (values) stored in the five data items.
FIG. 7 shows a two-dimensional array of data items in the memory unit of FIG. 3.

The data items in the memory space 32 may be arranged in a 2-dimensional (2D) array. In this case, each data item may have four neighbours. We will call the data array a 2-D "matrix", composed of rows and columns (the same terminology can also be used in higher dimensional arrays as described below, if a shift function as described below uses only these data pipe connections). This is illustrated in FIG. 7. The number of rows can be different from the number of columns.

Thus, the data item shown in FIG. 7 as "Data (M,N)" which is in the M-th row and the N-th column position and which can also be called "the data item (M, N)", can copy its value into any of the data items at positions (M−1, N), (M, N−1), (M, N+1) and (M+1, N). Or any one of these four data items can copy its value into the data item (M,N). In this case there are two index variables: N and M.

Many embodiments of the invention, for convenience, also include extra data pipes extending from a data item at one end of one row, to a data item at the other end of the neighbouring row. This is illustrated in FIG. 8, where the extra data pipes are shown dashed.

Thus, if N is for the moment used to denote the number of data items (the size) of a row and the variable M is used to label the rows, then, for every value of M, the data items (M−1,N) and (M, 1) are connected by a data pipe. Similarly, the data items (M, N) and (M+1,1) are connected by a data pipe. So, the last data item of every row in FIG. 8 is a neighbour of the next row's first data item. From another point of view, due to the extra data pipes, we can think of all the data items in FIG. 8 as forming a single row composed of 3×N data items. If the number of columns is denoted as M_max, optionally a data pipe may be provided between data items (1,1) and (M_max,N), so that the row becomes a loop.

Note that the extra data pipes mean that the index variables N and M are not equivalent. Starting from any given data item, one of the extra data pipes can be reached by successively increasing N, or successively decreasing it. This is not true for index variable M. Here, the index variable N is referred to as the "primary index variable".

FIG. 9 shows a matrix of 9 data items, with the rectangles representing respective data items containing a representation of the respective values (data elements) A, . . . , I stored in the data items. The value stored in any data item may take any value which is allowed by the physical memory technology (e.g. it may be any word).

1.10 Definition: Matrix (Dimension 3)

Embodiments can also employ an array of data items with a number of the dimensions greater than two. For example, a given embodiment might use a 3-D matrix of data items, which is made up of a plurality of 2-D matrices, where each 2-D matrix of data items is as defined above with reference to FIG. 8. Each 2-D matrix is referred to as a "page" (i.e. a layer of the 3-D matrix). The 3-D matrix array is illustrated in FIG. 10. A given address in the 3-D matrix is expressed using three index variables: P, M and N. Each data item is represented as a respective circle. Each data item in each page (2-D matrix) is connected by data pipes to the corresponding data items in the same respective matrix positions in the two adjacent pages.

Thus, the data item at address (P, M, N) could copy its value into its neighbours in the same matrix (P, M−1, N), (P, M, N−1), (P, M, N+1) and (P, M+1, N) and also to its neighbours in positions (P−1, M, N) and (P+1, M, N). Any one of these six data items could copy its value into the data item at (P, M, N).

In a similar way to the two-dimensional case, a typical embodiment includes extra data pipes between the pages (layers). Each extra data pipe connects the last data item in a given page to the first data item in the next page. So, denoting the number of columns for the moment by M and the size of the rows by N, for any value of P, there is a data pipe between the data item (P−1, M, N)) and first item of the following page (P, 1, 1). Thus, again, due to the extra data pipes (the ones between the rows of each matrix and the ones between matrices) the entire page can be considered as a single row, extending in the direction of the primary index variable N. Optionally, a data pipe may be provided from the data item (P_max,M,N) to the data item (1,1,1), thereby forming a loop.

1.11 Definition: Address Range

As explained below, a memory unit in the embodiment is capable of moving the data stored in a set of data items to a different place in the memory space. The set of data items (referred to as the "source") is normally not the whole memory and is defined by an "address range", which may be defined using a start address and a length of the source.

For example, for the one-dimensional case, an address range may be defined using a source address N and length L. This means L consecutive data items (each of which may be storing one respective word of data) starting from the one which has the address N.

In the case of a two-dimensional matrix, an address range may be defined using the primary index variable N (i.e. the index variable for which there is an extra data pipe from the data item which has the maximum value of N to the data item N=1 of the following row). Some address ranges are a sequence of a plurality of consecutive data items in the same row (i.e. having the same value of M). However, alternatively an address range may be a set of data items in which each pair of data items are either connected pairwise in the direction of increasing N, or are connected by one of the extra data pipes. In other words, if, as mentioned above, the whole matrix is considered, due to the extra data pipes, as constituting a single row, this would be a set of consecutive data items in this single row.

Similarly, in the case of the three-dimensional matrix, an address range may be defined using the primary index variable N, as a set of data items which are pairwise neighbours in which each pair of data items are either connected pairwise in the direction of increasing N, or are connected by one of the extra data pipes. In other words, if, as mentioned above, the whole 3-D matrix is considered, due to the extra data pipes, as constituting a single row, this would be a set of consecutive data items in this single row.

Irrespective of the dimensionality, we may define a "sequence" as a plurality of data items which are pairwise-neighbours in the direction of the primary index variable.

2. Shift Functions

We now turn to a description of logical functions which the data items in the memory space 32 of the memory unit 23, 24 are able to perform in the embodiment under the control of the controller 31 and which are not performed by a conventional memory unit.

2.1 A Primitive Shift Function

A "primitive" shift function is defined as a logical function in which one data item (or a plural data items) copy its value (their respective values) into its neighbour (their respective neighbours). The former data item(s) are referred to as the "source" data items and the latter data items are referred to as the "target" data items.

Example 2.1.1

Figure 11:
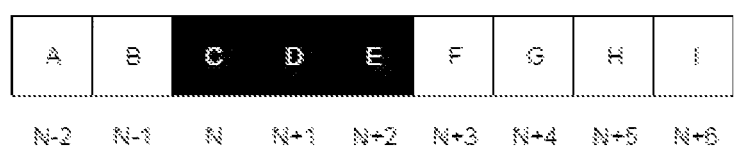
FIG. 11, which is composed of FIGS. 11(a) and 11(b), shows a primitive +1 data shift function performed by the memory unit of FIG. 3.
Figure 11:
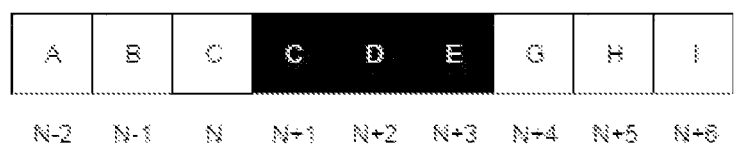

A 1-dimensional row primitive shift is illustrated in FIG. 11. FIG. 11(a) shows the content of a row of nine data items before the shift function and FIG. 11(b) shows the content of the row of nine data items after the shift function. The address of each of the data items is shown below the rectangular box representing it and the content is shown within it. In the shift function, a sequence of data items, which starts from the data item with address N and which has a length 3, is subject to a +1 shift. The three source data items are highlighted in FIG. 11(a) and the three target data items are highlighted in FIG. 11(b). This may be referred to as a shift function from address N in 3 length with +1 shift, or, more simply as a "primitive +1 data shift".

The result of the shift function is that values in a sequence which starts at the address N and which has a length of three data items, are moved to the next respective data items.

Note that the definition of a primitive shift function does not specify what data element (value) is stored by the data item at address N after the shift function is performed. This depends on the data cell technology used to implement the embodiment. In the example of FIG. 11 it is C (i.e. the original value) but in other embodiments it may be any other value (e.g. set always to a predefined value, such as 0).

Example 2.1.2

Figure 12:
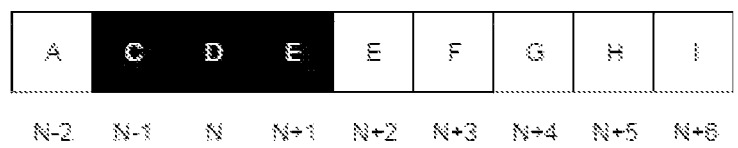
FIG. 12 shows a primitive −1 data shift function performed by the memory unit of FIG. 3.

Another example of a 1-dimensional row primitive shift is illustrated in FIG. 12. Before the shift function the content of a row of nine data items is as in FIG. 11(a). FIG. 12 shows the content of the row of nine data items after the shift function. The address of each of the data items is shown below the rectangular box representing it and the content is shown within it. In the shift function, a sequence of data items, which starts from the data item with address N and which has a length 3, is subject to a −1 shift. The result of the shift function is that values in a sequence which starts at the address N and which has a length of three data items, are moved to the preceding respective data items. This may be referred to as a "primitive −1 data shift".

Note that the definition of a primitive shift function does not specify what data element (value) is stored by the data item at address N+2 after the shift function is performed. This depends on the data cell technology used to implement the embodiment. In the embodiment of FIG. 12 it is the original value, but in other embodiments it may be any other value (e.g. set always to a predefined value, such as 0).

Example 2.1.3

Figures 13, 14:
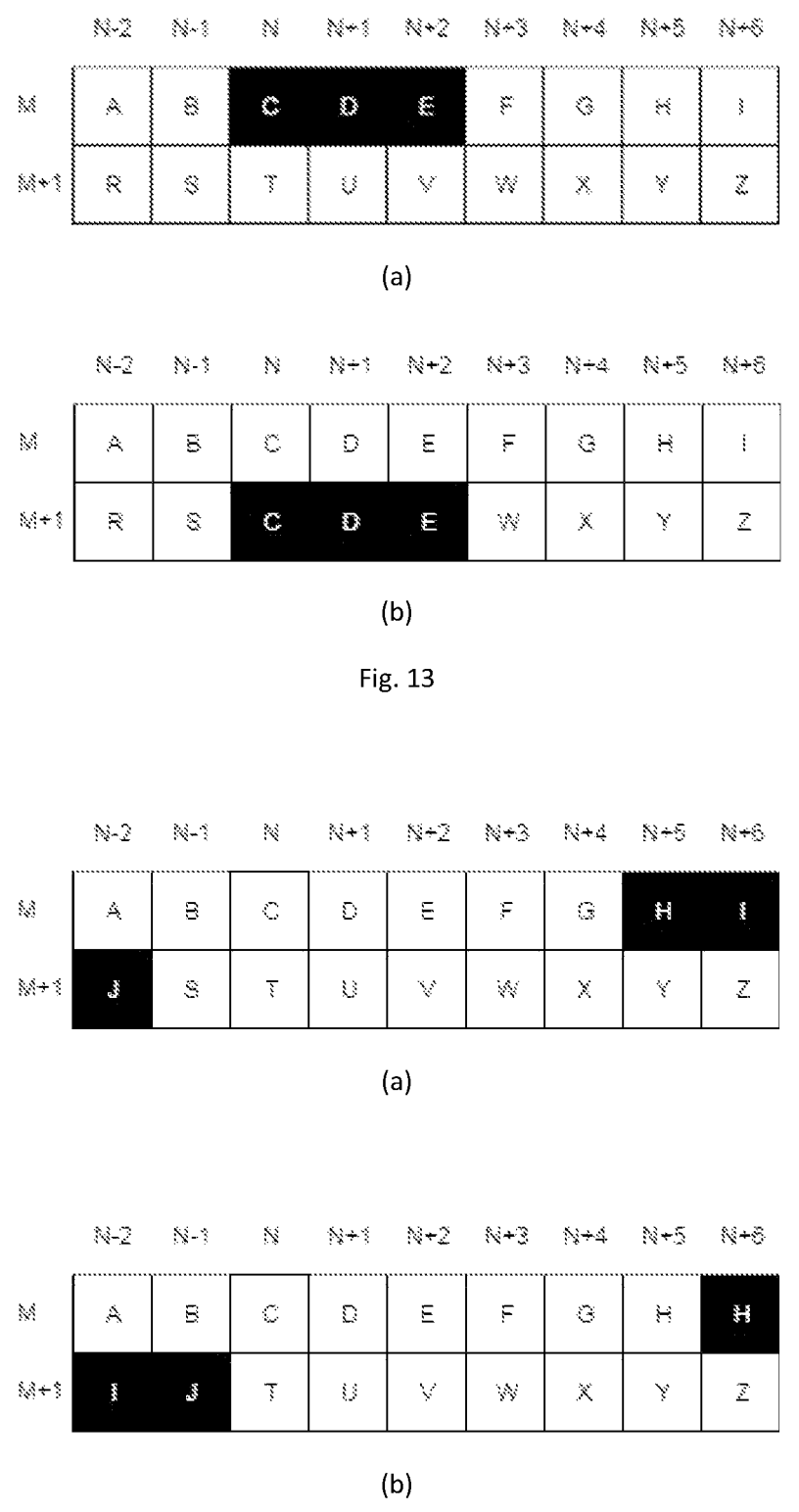

FIG. 13 illustrates a primitive row shift function in a 2-D matrix. FIG. 13(a) shows the content of a matrix of 18 data items before the shift function and FIG. 11(b) shows the content of the matrix of 18 data items after the shift function. In the shift function, a sequence of data items, which starts from the data item with address (N, M) and which has a length 3, is subject to a "+1 row shift".

A three- or more dimensional primitive shift is similar to the examples given above. In all cases, a number L of source data item(s) write their respective stored values into their respective neighbours. We now consider a special case of a primitive shift function. As explained above in relation to FIG. 8, the data item at the end of each row is a neighbour of the first data item in the next row. With this in mind, FIG. 14 illustrates a primitive shift function from address N+5 of length 3 with +1 shift. FIG. 14(a) shows the content of 18 data items prior to the shift function and FIG. 14(b) shows the content of the 18 data items after the shift function.

2.2 Shift Composition

A shift composition is a function composed of more than one primitive shift functions.

In the case of a memory space 32 which is a one-dimensional row of data items, a shift composition means that a sequence of data items of length L is shifted by a distance K. This is done by successively applying a primitive signum (K) shift |K| times.

Example 2.2.1

If the shift composition function is a shift from address N in 3 length by a shift 3, it is performed by successively applying a primitive +1 data shift three times. The content of the data items in a matrix before the shift composition function is illustrated in FIG. 15(*a*) and the content of the data items after the shift composition function is illustrated in FIG. 15(*b*).

Example 2.2.2

If the shift composition function is a shift from address N in 3 length with shift −2, it is performed by successively applying a primitive −1 data shift twice. If the content of the data items in a matrix before the shift composition function is illustrated in FIG. 15(*a*), the content of the data items after the shift composition function is as illustrated in FIG. 16.

A shift composition function may also by used to move the values stored in the data items in an address range within a 2-dimensional matrix of data items, by more than 1 step.

Example 2.2.3

Figure 17:
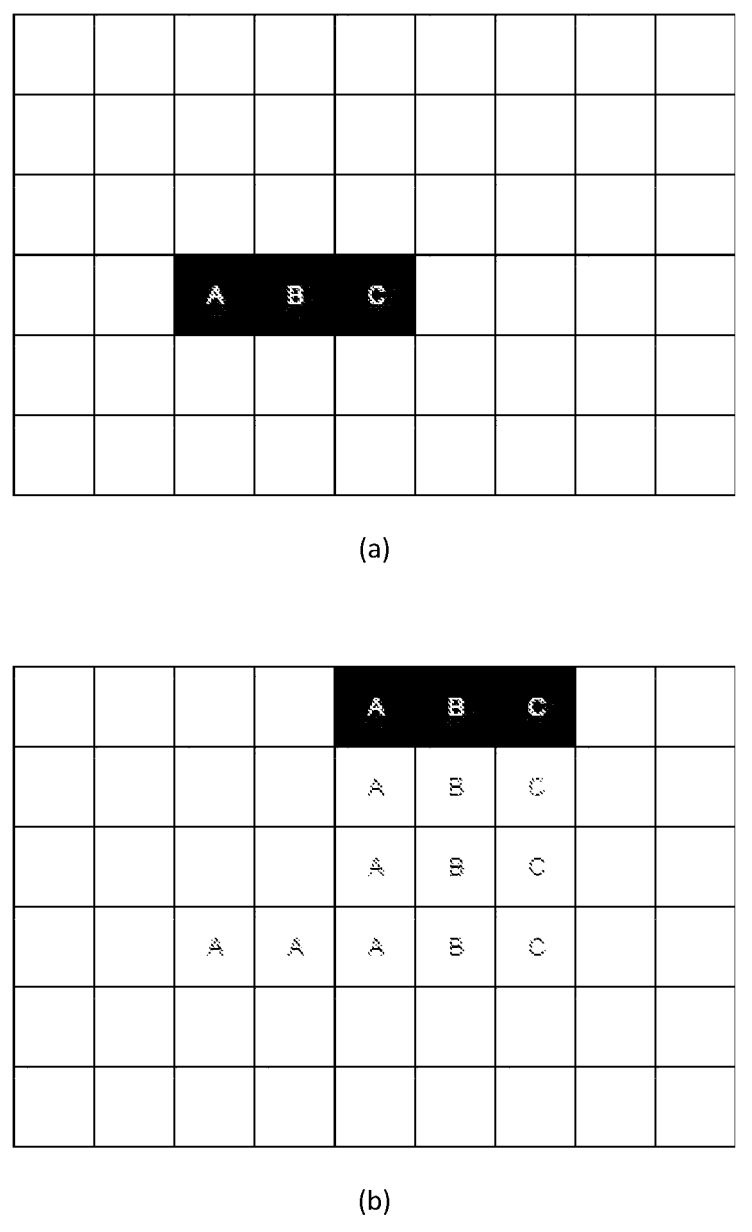

FIG. 17(*a*) shows the values stored in three data items of a 2-dimensional matrix of data items before a shift composition function and FIG. 17(*b*) shows the values afterwards.

2.3 Optimised Shift Functions

A shift composition function is defined only in terms of the source data item(s) and the target data item(s). In the two-dimensional (or higher dimensional) case, some shift composition functions can be performed in multiple ways.

Example 2.3.1

In a matrix in which the row size is 100, a shift composition function which is equivalent to three hundred primitive +1 data shifts, can also be formed as three +1 row shifts.

Example 2.3.2

If a shift composition function in a matrix with row size 100 is equivalent to ninety-nine primitive −1 data shifts, we can instead use one −1 row shift and a +1 primitive shift (in either order).

Example 2.3.3

In a three-dimensional data item array, where each layer has 100 rows and 100 columns, a shift composition which can be performed by 10001 primitive +1 data shifts can also be performed by one primitive +1 data shift and one primitive layer shift. Thus, it can be done in 2 steps, instead of 10001 steps.

2.4. Implementation

Shift functions are defined above in logical terms. However, in some practical realisations the pattern of data pipes available may differ from that described above. Here we describe features which may be used in such cases.

2.4.1 Shift Buffer

It is possible that some of the data pipes described in section 1 may not exist in certain embodiments. For example, no mechanism may be provided for any given data item in the memory space 32 to change its neighbour's state. An alternative would be to provide a buffer 33 ("shift buffer") which can store at least one data item (or one or more of its block values). The buffer 33 may include a number of buffer data items, each of which is associated with a group (set) of data items in the memory space 32. Each buffer data item is connected to one of more of the respective associated group of data items in the memory space 32, such that data can be written between each buffer data item and any one of the respective group of data items in the memory space 32.

The exact connections between the data items in the memory space 32 and/or the data items in the buffer 33 different from one implementation to another. However, conveniently, the buffer 33 is provided as an extra row (or column) of the memory space 32.

Example 2.4.1.1

Figure 18:
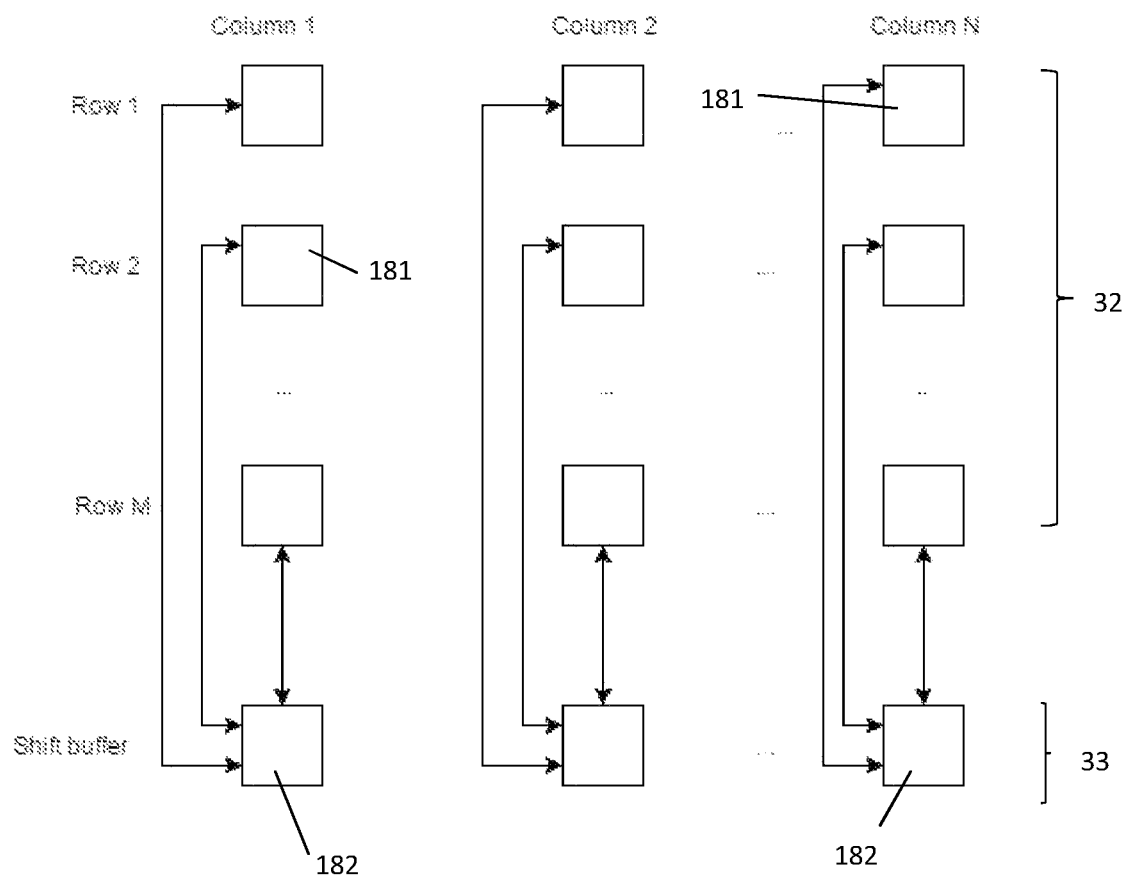
FIG. 18 shows a portion of the memory space and a buffer in one form of the memory unit of FIG. 3.

As shown in FIG. 18, the memory space 32 consists of M rows of data items 181, each of which contains N data items. N buffer data items 182 are provided as a buffer 33. Each buffer data item 182 is connected by data pipes to each data item of a corresponding column of data items in the memory space 32, so each data item of the memory space 32 can set the value stored in the corresponding buffer data item 182, or alternately each data item of the memory space 32 can be made to store the value in the corresponding buffer data item 182. For simplicity FIG. 18 omits data pipes extending in the horizontal direction in the figure, but typically such data pipes would be provided along each of the M rows of data items 181 in the memory space 32 and/or along the row of buffer data items 182 in the buffer 33.

Note that the data in row N of the memory space 32 can be copied to any other row in two steps. In the first step, the data is copied into the buffer; and in the next step, the data is copied into the target row. Thus, each row is neighbour to every other row in a two-step function. Furthermore, the data stored in any two consecutive rows of the memory space 32 can be exchanged in three steps: (1) copying the data from one of the two rows ("row A") into the buffer; (2) applying a +1/−1 row shift of data into row A respectively from row A−1 or row A+1; and (3) moving the data from the buffer respectively into row A−1 or row A+1.

Example 2.4.1.2

Figure 19:
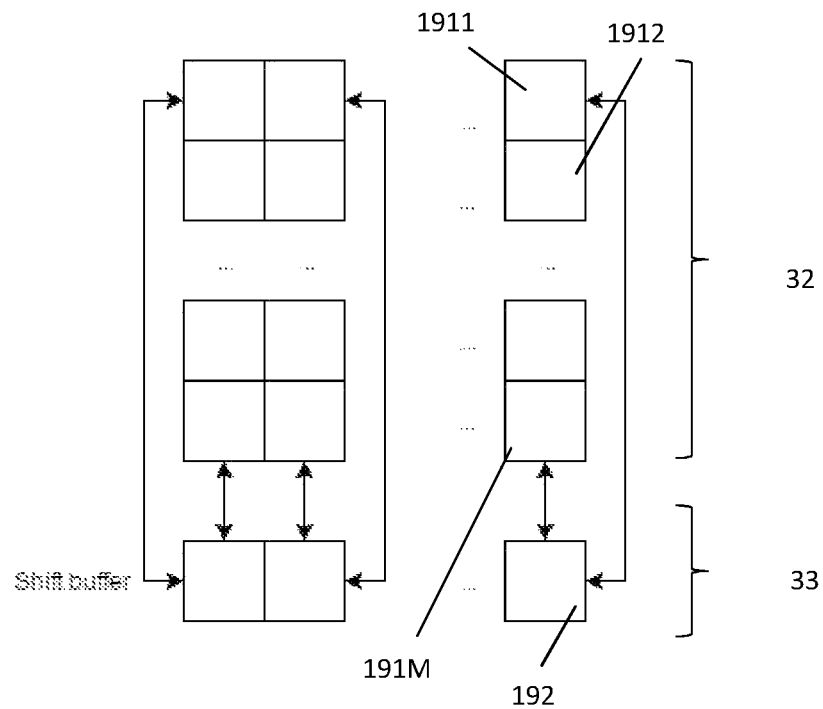
FIG. 19 shows a portion of the memory space and the buffer in another form of the memory unit of FIG. 3.

As shown in FIG. 19, each given column of the memory space 32 is M memory data items labelled 1911, 1912, ... 191M. These are connected by data pipes pairwise (in the manner of FIG. 7 or FIG. 8), which is denoted by the fact that the respective boxes representing the data items touch pairwise. The buffer 33 includes, for each column of data items in the memory space 32, a respective buffer data item 192, which is connected by data pipes to the top memory data item 1911 and the bottom memory data item 191N of the respective column. Thus, the cells in the first and last rows of the memory 32 have an extra neighbour in the form of the corresponding buffer data item. The buffer data items 192 are illustrated pairwise-touching to indicate that there are data pipes between them.

Example 2.4.1.3

Figure 20:
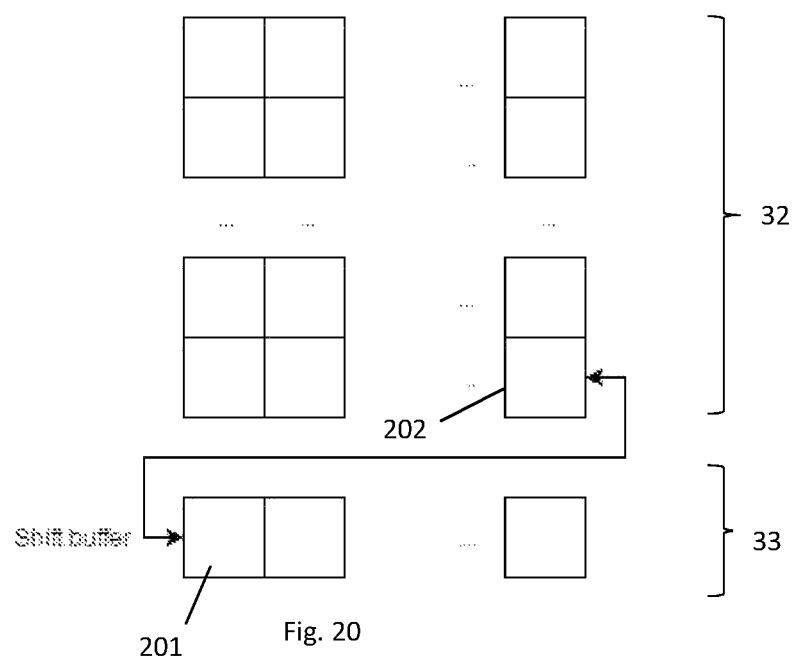
FIG. 20 shows a portion of the memory space and buffer in another form of the memory unit of FIG. 3.

In the example of FIG. 20, in which the memory space 32 is as in FIG. 19, the first buffer data item 201 is connected by a data pipe only to the last data item 202 of the memory space 32. The buffer data items are connected pairwise by data pipes, so that the values stored in the last row of the memory space 32 can be moved by primitive shift operations into the shift buffer 33. This architecture is convenient for moving data between memory banks, if each has an arrangement as shown in FIG. 20 and in each the buffer 33 acts as the conduit from the memory bank to a data bus which connects the memory banks.

2.4.2 A Wave

In the examples of section 2.4.1, multiple write operations are performed simultaneously (that is, in parallel at substantially the same time); this is possible with current SRAM memory. However, in some embodiments, e.g. due to the data cell technology used to implement each data item, or because the blocks (i.e. address ranges) to be shifted overlap (i.e. the target data items overlap with the source items; this is the case for a primitive shift of length greater than one), it may not be possible to shift the values stored in a block of data items simultaneously. For example, this is not possible in current DRAMs. In this case, it may be convenient to implement one of the shift functions as a "wave". That is, the value(s) stored in one or more data items is shifted to neighbouring data items in a first moment and the values stored in one or more other data items are shifted in a second moment, etc.

Example 2.4.2.1

Figure 21:
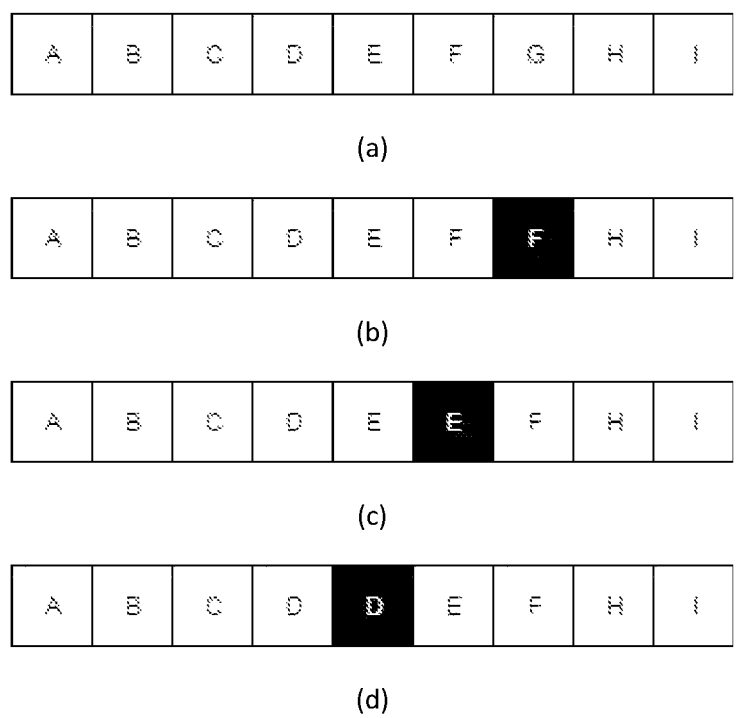
FIG. 21, which is composed of FIGS. 21(a)-21(d), shows a wave process used to implement a primitive shift function one form of the memory unit of FIG. 3.

An example of using a wave to realise data item shifting is illustrated in FIG. 21, where FIG. 21(a) illustrates the data stored inside nine data items before the wave and FIGS. 21(b), 21(c) and 21(d) illustrate the data stored inside the nine data items during 3 successive steps during the wave operation.

Example 2.4.2.1

Figure 22:
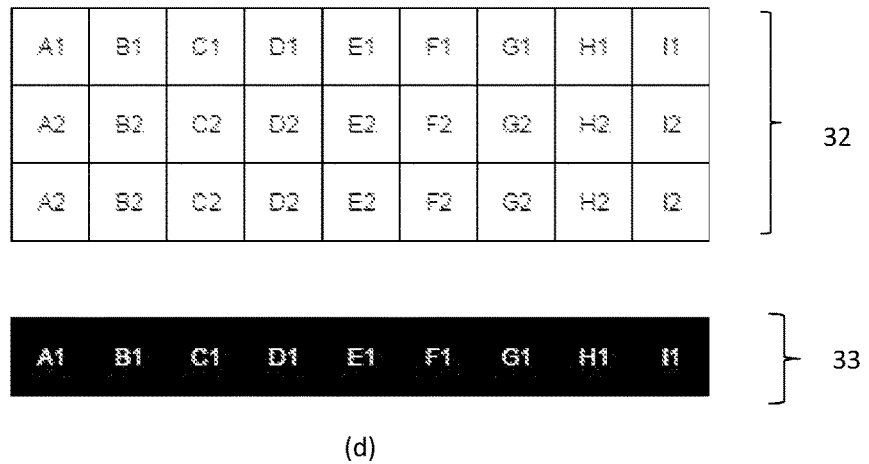
FIG. 22, which is composed of FIGS. 22(a) to 22(e), shows a shift operation using a buffer in one form of the memory unit of FIG. 3.
Figure 22:
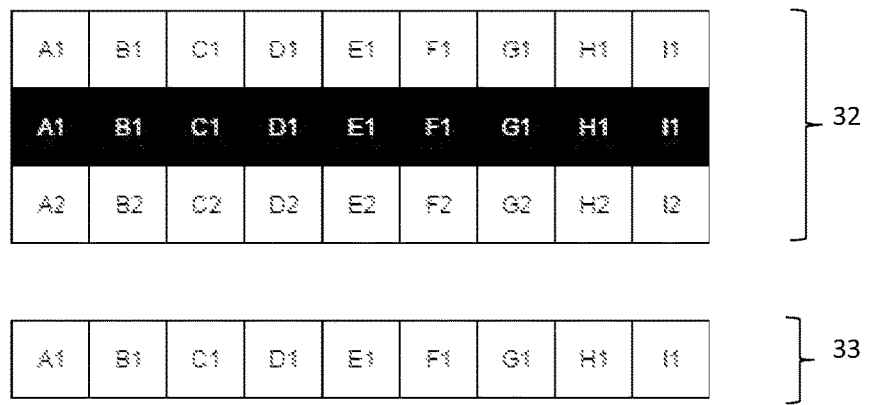

An example of using a wave to realise row shifting using a buffer is illustrated in FIG. 22, where the row shifting operation is to move the first two rows of a 2-D matrix of data items two rows downwardly. FIG. 22(a) shows the data stored inside a 2-D matrix of data items before the wave. In the 2-D matrix of data items which constitutes the memory space 32, there are no data pipes in the vertical direction (or for some reason these data pipes may not be used in the shift operation). FIGS. 22(b), 22(c), 22(d) and 22(e) illustrate the data stored inside the data items of the memory 32 and buffer 33 after respective steps of the wave operation. The highlighted data items are the ones which were changed during the respective step.

3. Size of Data Items and Dimensions 3.1 Data Items

The best size of the data items (i.e. the size of the data element which each data item can store) may be different in different applications.

Example 3.1.1

For Big Data or fast data storage the best size for the data items is typically the size of words used by the CPU architecture. This means the every data item could store an integer, float or pointer data for a string, structure or class. The operation of inserting an item into the memory space, or deleting an item from it, can be performed using a primitive shift function which shifts elements by one position.

If the row size is 10 or 100, the embodiment makes it possible to insert or delete 10 or 100 items in one step. The best data row size may be the size of the memory cell technology row size, which may minimize the size of the wires/data pipes between data items, because the physical and logical data size will be the same. For example, for a 2 kb data row (i.e. 32 64 bit words) in DRAM, it may be optimal if the logical data item size is 64 bits and the row size is 32 data items.

Example 3.1.2

If the hardware infrastructure is bit-based for black-and-white picture handling (e.g. for an astronomical device), the best data item size may be one bit. The row size may be optimally chosen as the same size as the row resolution and the page size may be chosen as the dimension of one picture of the device.

3.2 Row Size Optimization

For a given application the dimensions of the memory may be selected in an optimal way. It is expected that in general the best size for a data item is one word, but to obtain a numerical value for the size of this effect we have to assume a word size. For the moment, we will assume that each word is 64 bits. We seek to optimize the row size for different inserting and deletion operations. Performing these operations for a single word can be accomplished by a primitive shift. The question is what happens if we have to insert or delete more than one word. Table 1 indicates various values which apply to this process.

TABLE 1

| Maximum shift size Word shift | Byte shift | Optimal size | Mean step | Max |
|---|---|---|---|---|
| 4 | 32 | 2 | 2 | 2 |
| 8 | 64 | 4 | 2 | 3 |
| 32 | 256 | 8 | 4 | 7 |
| 128 | 1,024 | 16 | 8 | 15 |
| 512 | 4,096 | 32 | 16 | 31 |
| 2,048 | 16,384 | 64 | 32 | 63 |
| 8,192 | 65,536 | 128 | 64 | 127 |
| N | 8 byte = 1 word | root(2N) | jump size/2 | jump size − 1 |

We now present an example of how to use Table 1. Experimentally we have found that for many existing programs it is common for users to insert into their arrays items (e.g. strings) of maximum length 32. From table 1, this means inserting 256 bytes. In that case, Table 1 shows that the optimal row size is: 8. This means that every shift between 1-32 can be finished on average in 4 steps, but at most in 7 steps. The "steps" are optimized shifts: to perform a shift with 9 or 7 words, we first shift 8 in one step (because the row size is 8) and then perform a primitive +1 or −1 shift.

Alternatively, Table 1 can be used in the opposite order. If we know that our memory technology uses a row size of 2 kbit, this means that one row contains 32 words. This value is located in the "Optimal size" column, thereby indicating a row of Table 1. The other entries in the row show that every shift to insert 1-512 words (4 kB) can be performed on average in 16 steps, but at most in 31 optimized shift steps.

4. Performance

We now discuss advantages of the memory units 23, 24 over conventional memory units. The memory units 23, 24 are here referred to as a "shift memory".

As indicated in Table 1, the time taken by a shift memory to perform a shift function depends on the number of shifting steps, not the shifted memory size. The time taken to insert some words into a 1 k or 100 GB array is the same. For this reason, the memory units 23, 24 can use the same algorithms for dynamic data as for static data.

4.1 Freeing Resources

To perform a shift function, the only required communication between the CPU 22 and a memory unit 23, 24 is a shift command specifying a memory address, an amount of data to be shifted and a shift distance. Given this, the memory controller 31 of the memory unit 23, 24 can do the shifting in some optimized shift steps. The CPU 22 could work on other problems during this time, or could be in an idle state. The data cache of the CPU is not required, the data bus will be ready (and empty) for other data exchange and the memory unit 23, 24 can work directly with the data block, without having to compile every data word one-by-one.

4.2. Data Structure Performance

One of the most important advantages of the shift memory is that a very simple data structure (array or sorted array) can be used to store data. This permits easier development, testing, compiling of software which uses the shift memory.

In Tables 2 and 3 we compare the performance of a shift memory with various sophisticated known algorithms which have been proposed to address the data bus bottleneck problem. Unfortunately all of them create different other problems, so they all have performance issues in applications involving dynamic data handling. By contrast the performance of a shift memory is optimal and predictable.

TABLE 2

| Data Structure | Time Complexity Average Access | Search | Insertion | Deletion | Worst Access | Search | Insertion | Deletion |
|---|---|---|---|---|---|---|---|---|
| Array | O(1) | O(n) | O(n) | O(n) | O(1) | O(n) | O(n) | O(n) |
| Stack | O(n) | O(n) | O(1) | O(1) | O(n) | O(n) | O(1) | O(1) |
| Singly-Linked List | O(n) | O(n) | O(1) | O(1) | O(n) | O(n) | O(1) | O(1) |
| Doubly-Linked List | O(n) | O(n) | O(1) | O(1) | O(n) | O(n) | O(1) | O(1) |
| Skip List | O(log n) | O(log n) | O(log n) | O(log n) | O(n) | O(n) | O(n) | O(n) |
| Hash Table | — | O(1) | O(1) | O(1) | — | O(n) | O(n) | O(n) |
| Binary Search Tree | O(log n) | O(log n) | O(log n) | O(log n) | O(n) | O(n) | O(n) | O(n) |
| Cartesian Tree | — | O(log n) | O(log n) | O(log n) | — | O(n) | O(n) | O(n) |
| B-Tree | O(log n) | O(log n) | O(log n) | O(log n) | O(log n) | O(log n) | O(log n) | O(log n) |
| Red-Black Tree | O(log n) | O(log n) | O(log n) | O(log n) | O(log n) | O(log n) | O(log n) | O(log n) |
| Splay Tree | — | O(log n) | O(log n) | O(log n) | — | O(log n) | O(log n) | O(log n) |
| AVL Tree | O(log n) | O(log n) | O(log n) | O(log n) | O(log n) | O(log n) | O(log n) | O(log n) |
| Shift memory | | | | | | | | |
| Unsorted Array | O(1) | O(n) | O(1) | O(1) | O(1) | O(n) | O(1) | O(1) |
| Sorted Array | O(1) | O(log n) | O(log n) | O(log n) | O(1) | O(log n) | O(log n) | O(log n) |
| Hash table with sorted array collisions | | O(1) | O(1) | O(1) | — | O(log n) | O(log n) | O(log n) |

TABLE 3

| Graph Operations Node/Edge Management | Storage | Add Vertex | Add Edge | Remove Vertex | Remove Edge | Query |
|---|---|---|---|---|---|---|
| Adjacency list | O(|V| + |E|) | O(1) | O(1) | O(|V| + |E|) | O(|E|) | O(|V|) |
| Incidence list | O(|V| + |E|) | O(1) | O(1) | O(|E|) | O(|E|) | O(|E|) |
| Adjacency matrix | O(|V|^2) | O(|V|^2) | O(1) | O(|V|^2) | O(1) | O(1) |
| Incidence matrix | O(|V| · |E|) | O(|V| · |E|) | O(|V| · |E|) | O(|V| · |E|) | O(|V| · |E|) | O(|E|) |
| Shift memory Adjacency list | | | | | | |
| Sorted by Edges | O(|V| + |E|) | O(1) | O(log |E|) | O(|V| + log |E|) | O(log |E|) | O(log |E|) |
| Sorted by Vertex | O(|V| + |E|) | O(log |V|) | O(1) | O(log |V|) | O(|E|) | O(|E|) |
| Sorted by Edges and Vertex | O(|V| + |E|) | O(log|E| + log |V|) | O(log |E|) | O(log |E| + log |V|) | O(log |E|) | O(log |E|) |

4.3 Energy Saving

From the previous descriptions it can be seen that the shift memory makes it possible to moves the same amount of data as the current technologies. The energy consumed by the memory unit itself to perform primitive shifting will be almost the same as in known technologies. However, because the data does not have to travel through the data bus, the CPU cache, the CPU core and back to the memory unit, all the energy used in these conventional steps will be saved. In particular, the CPU does not have to use any energy while the memory shifting is running (which means less energy is used overall). Alternatively, the CPU can execute other tasks during this time. The result of this is that the shift memory leads to the computer system having more computing power, because the CPU is disencumbered from millions/billions of operations.

4.4 Garbage Collection

Garbage collection (that is, defragmentation of a memory, by compaction of valuable data into a contiguous (or near contiguous) portion of the physical address space) is an important service in some programming frameworks, since it makes easier the programmer's job. Conventionally, a garbage collection operation suspends the running of user code while the CPU performs the required time-consuming read and write operations, in which the data is transferred through the bus. Unfortunately it is hard to predict when this process will run, or how long it will take, so in conventional systems it can create unplanned and unanticipated lags in the running. These lags may be experienced in the user interface, or in performance of a computing task.

A further problem is that conventionally a memory unit does not have sufficient data to distinguish between data cells which are storing useful data and data cells which are storing waste data. A DRAM memory has to refresh its data cells at intervals to avoid the stored data being lost, so the memory is arranged to refresh all the data cells, including the ones currently storing waste data.

By contrast, in the case of a shift memory according to an embodiment of the present invention, garbage collection can be continuous and so should not lead to unexpected lags. For example, following any memory operation (or at least any memory operation having one or more predefined characteristics, such as operations which cause more than a predetermined amount of waste data to be stored in the memory), there may be a compaction operation of compacting the valuable data. In this case, after the compaction operation all data items storing valuable data may be included within a contiguous region of the address space which does not include any data items which store waste data.

In the case that the memory is one which uses a memory refresh operation, the memory refresh operation may be turned off in unused memory blocks (that is, groups of one or more data cells which store data which is no longer required; "waste data"), while continuing to perform it in memory blocks which are storing valuable data. This results in an additional energy saving. For example, if there is a garbage collection such that no data items outside a contiguous region of the logical address space are storing valuable data, then refresh operations may be disabled for the data items outside that contiguous region. If any of the data cells which are not refreshed are subsequently designated for storage of valuable data, advantageously they are already in a known state (e.g. storing zeros), so the number of computational operations required to write the valuable data can be reduced.

Note that, as in a conventional system, the garbage operations may be controlled by framework code. That is, while the framework code uses the CPU and the memory, the garbage collections are not actually built into the operation of the CPU and the memory (i.e. it is not a hardware function), but instead the garbage collection controlled by the software (e.g. an operating system) the CPU is running. The framework code may transmit disable instructions to the memory unit to disable the refresh operation for areas of memory which only contain waste data. The disable instructions may include data specifying data items which are not to be refreshed (e.g. by specifying a range of such data items).

5. Data Pipes in Different Data Cell Technologies

The preceding description of embodiments described the data pipe in logical terms (i.e. without taking into account how it can be implemented in electronics), to focus on the targets and performance. As explained above, the shift memory concept is independent from any specific memory cell technology; it is a general solution for any storage with data pipes and shift functionality. However, we will now give an example of how the data pipe can be implemented.

5.1 The General Data Pipe Logic

Figure 23:
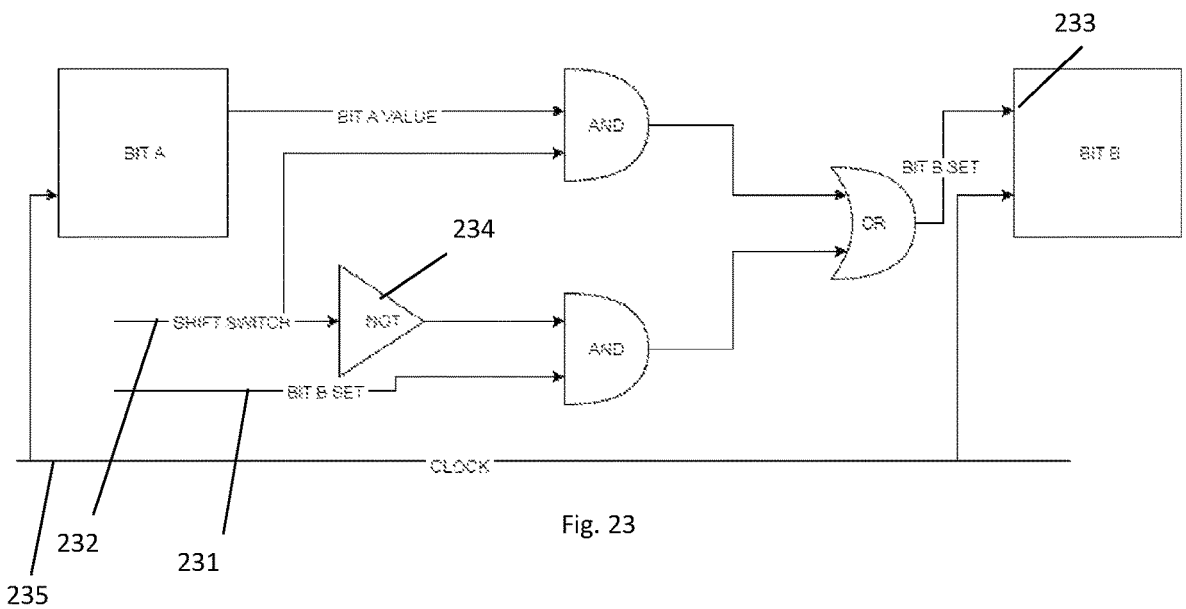
FIG. 23 shows circuitry which may be used to implement a portion of the memory of the memory unit of FIG. 3.

Referring to FIG. 23, bit A is a bit of a first one of the two data items connected by a data pipe and bit B is the corresponding bit of the other "second" data item. The other circuitry in FIG. 23 is used for writing data to bit B. This circuitry decides whether to set the value of bit B to be either a data value supplied by a set wire (a set wire of this type is included in conventional memory units and is used during a write operation), or to be the same as the bit A. Note that the circuitry which implements the part of the data pipe from bit B to bit A is omitted for simplicity.

If the Shift Switch 232 takes a high value, bit B will receive the value of bit A at input 233. If the Shift Switch take a low value, bit B will receive the value of the normal set wire 231 at input 233. Whenever the clock signal 235 performs a click (e.g. goes to a high value, or goes to a low value), the value received at the input 233 is written to the bit A.

Most of the circuitry of FIG. 23 is provided for each respective bit B of the second data item. However, because the shift functionality works on words and because all bits of the word are transferred between the data items on the same clock click, the NOT gate 234 can be in common between all bits of the whole word. In other implementations of the data pipe there may be other components which are in common between multiple bits (or even multiple data items), but the result should be the same: the bit B value can be set from the normal set wire, or from one of its neighbours.

As noted above, FIG. 23 just shows the circuitry for copying bit A to bit B. For the full functionality the bit B should be provided with identical circuitry to set bit A. This is because the data pipe is symmetrical, so that it is able to do both inserting and removing operations.

5.2 The Wave in the Circuit Logic

The circuit of FIG. 23 works well in for an SRAM cell, because the SRAM input and output are in different clock clicks, so it is possible to send the values to the neighbours in the same click: the sent value is the previous value of every cell, so it can send that to the next cell at the same moment. Thus, the primitive shift function can be performed for all the data items of the address range in parallel. However, DRAM cells receive and send values at the same clock click. So, if the data items are implemented as DRAM cells, a shift function is preferably performed using a wave solution, which means the shifting is performed in a series of steps performed in respective consecutive clock clicks. The direction of the wave is opposite to that of the shifting: if the shift function is used to perform an insert operation, the wave starts at the end of the address range which forms the source data items and finishes at the start of the address range; if the shift function is used to perform a deletion operation, the wave starts from the first data item of the address range and finishes at the last data item. A wave is slower than the parallel shift operation which is possible for an SRAM memory. However, a wave within the memory unit can still be much faster than moving the words through the data bus 25 as in a conventional method.

The wave also means that there is no high peak in energy consumption. If data (e.g. thousands of words) is copied between data items in parallel, this requires a lot of energy to be consumed at the same clock tick. So the memory unit will have large voltage peaks when a large amount of data is moved in a shift operation. By contrast, when a wave is used, the wave spreads this peak over multiple clock cycles.

5.3 The Use of a Buffer in Performing Shift Functions

An alternative way of performing a shift function for a memory unit 23, 24 employing DRAM cells is to use the buffer 33. Note that a conventional DRAM memory already employs a refresh buffer for every memory page (in a refresh operation whole rows are copied into the refresh buffer and the copied back to the data cells again) and this conventional refresh buffer may also be used as the buffer for a shift function. Specifically, to carry out a shift function, the controller 31 can write the values stored in a whole row of data items to the buffer, then the write the values into another row of data items. This makes the memory module perform a shift function in a different way: every row will be neighbour of every other row. So we can shift by more than one row in one step. When using a wave, the embodiment can go through the rows taking to choose the order of the rows so as not to overwrite required data rows.

Example 5.3.1

We now describe a process of using a buffer to perform a shift function, which is particularly suitable for use in a DRAM memory.

Figure 24:
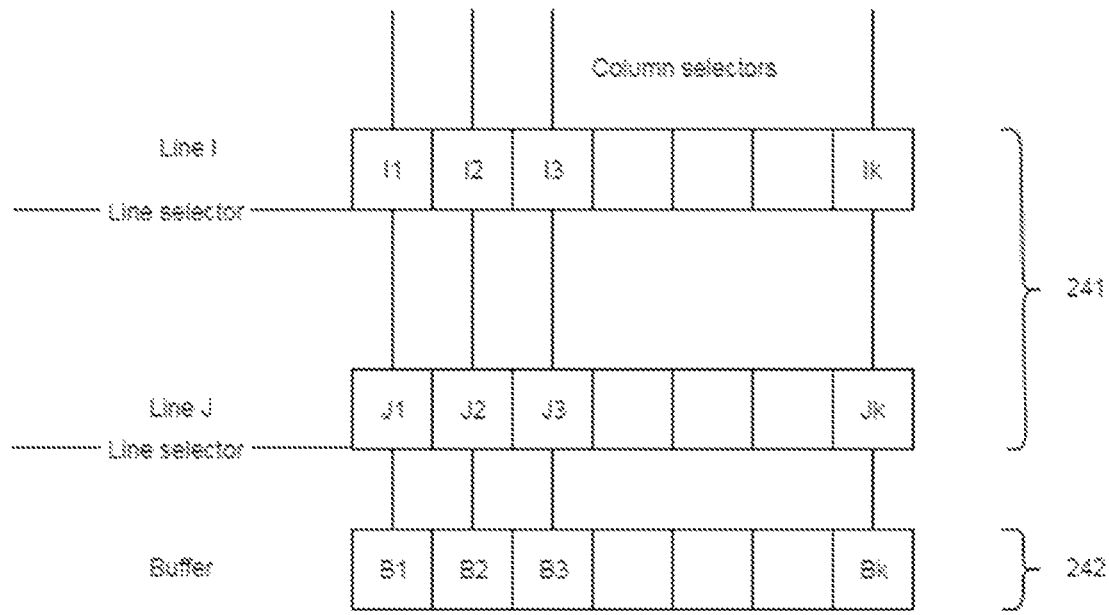
FIG. 24 to FIG. 27 show a method of performing a shift operation in a form of the memory of FIG. 3 which includes a buffer.

FIG. 24 illustrates, at a physical level, a portion 241 of the memory space 32 and the corresponding portion 242 of the buffer 33 (which may be the refresh buffer of the DRAM memory, which is implemented as an SRAM and composed of connected data items which each store one bit). At this level, the memory portion 241 consists of a 2-D array of DRAM memory cells. There are k cells in each row of the array and each stores one bit of data. The cells of the first row are labelled I1 to Ik. The cells of the last row are labelled J1 to Jk. Columns of the array are activated by "column selector" leads and rows are selected by "line selector" leads. The buffer portion 242 includes a respective buffer memory cell for each column, labelled B1 to Bk. Data lines exist to connect each buffer memory cell to all the corresponding memory cells of the respective column.

In the starting state, every memory cell stores a respective value. The initial state of the data stored in the buffer data items is undefined.

The steps of the process are as follows:

1. Reading data from line n to the buffer (the DELETE step)

Figure 25:
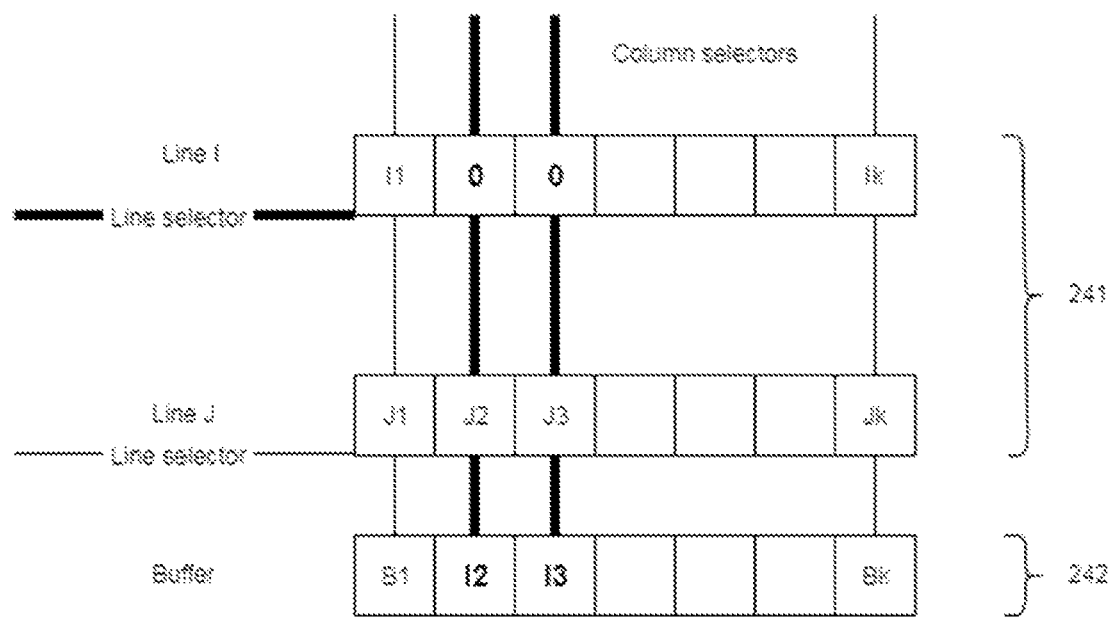

The line selector of the line n and the second and third column selectors, are made active. This causes the data values in the cells in the second and third columns of line n to be written into the second and third cells of the buffer portion 242. This is shown in FIG. 25.

In a conventional DRAM memory cell implementation, the values stored in the second and third cells of line n are deleted (set to zero) in this process. Note that if it was intended for these two memory cells to be set to zero, this has been achieved without sending 0's through the data bus 25. On the other hand, as mentioned below, the final step of the present process (step 3) is to return these two cells to their original state. If this is not desired, or if the memory technology used to implement the two memory cells does not set them to zero in step 1, then step 3 can be omitted.

2. Write the value into another line (the MOVE step)

Figure 26:
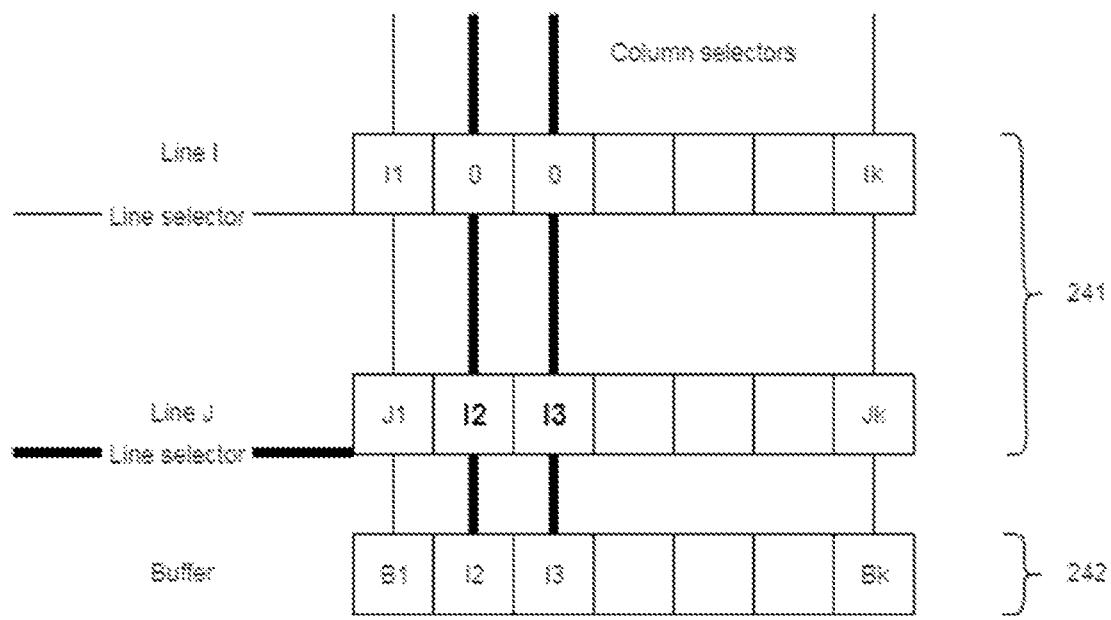

In this step the controller 31 selects and activates another line (say line m) and again selects and activates the column selectors for columns 2 and 3. The values stored in the second and third cells of the buffer portion 242 are written into corresponding cells of line m (the target cells). This is shown in FIG. 26

In the DRAM technology the memory refresh buffer is SRAM, so the values stored in the buffer cells are not changed in this step.

3. Write back the lost value into the source line (the COPY step)

Figure 27:
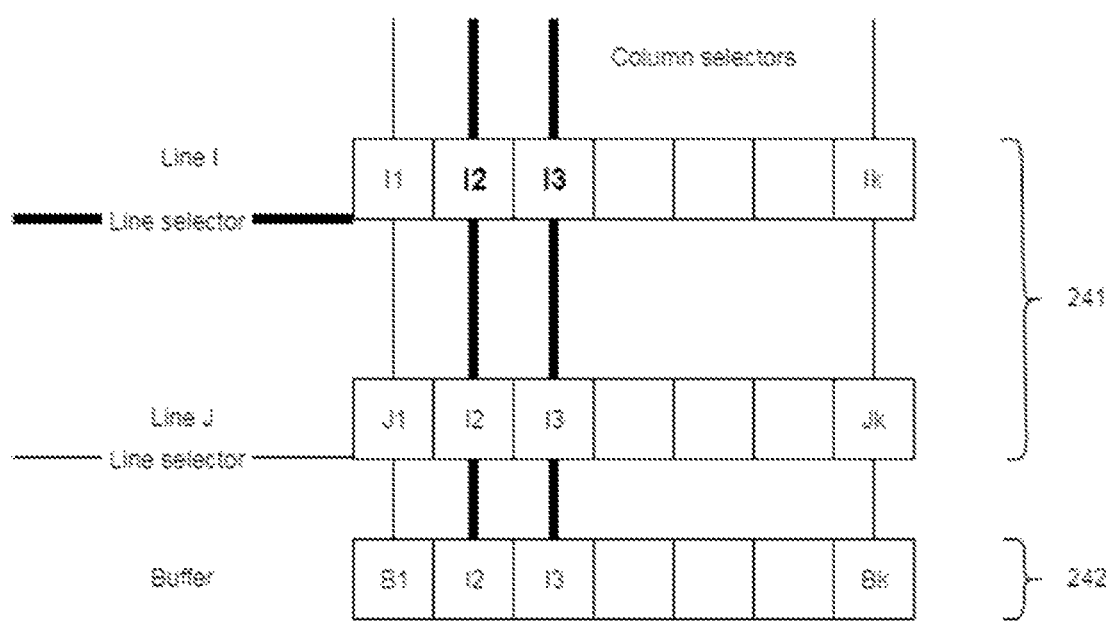

The controller 31 again activates line n and the $2^{nd}$ and $3^{rd}$ columns and writes back the original value of the read cells into the Line n. This is shown in FIG. 27.

In conclusion, the process described above allows the controller 31 to remove, move or copy values between some or all cells of selected lines of the memory portion 241.

5.4 Other Buffering Processes

Embodiments employ a memory space 32 implemented using DRAM technology, or any other cell technology and may make use of any SRAM parallel shifting ability in the buffer. That is, the embodiments may be operative to perform shift composition functions, in which row shifting is performed using the buffer reading process explained in section 5.3 and smaller shifting steps are performed using the parallel shifting capability of the buffer, followed by rewriting the results into the same row or another row.

Embodiments which use this trick can decrease the cost of the data pipes in the memory module, because the buffer wires are already in existence due to the underlying cell technology itself (e.g. the refresh buffer wires and circuits) and it is only required to add extra circuitry to the refresh buffer of the conventional memory units to effect the smaller shift steps.

Note that the buffer data items are particularly useful compared to the DRAM cells used to store the memory space 32 data because the buffer exhibits two properties. First, the buffer reads complete lines. Secondly, when it writes its data, its own state typically does not change. So, a buffer can write the whole line into another line in a copy process, not just a move process.

Furthermore, embodiments of the invention can use the buffers for communication between memory banks (i.e. when multiple memory units 23, 24 are present and it is desired to move data between them). It is not convenient to provide data pipes between different memory banks (memory units), because this would require too much wires between them, which makes the hardware vulnerable at the time of production or repair. Instead, we can use the buffer to connect the different memory banks, with a special data pipe to send data between the respective buffers of the different memory banks. In other words, it is desirable that all the transfer of data between memory units is performed using a buffer to store the "orphan data items" (the ones which are to move between the memory units), using a normal data bus. Because the data which has to be transferred is typically small (less than a row size) this does not retard the performance significantly.

In one implementation different memory units may be used to store different pages of a 3-D array of data items. If at least one pipeline is provided between the memory units, all the orphan data could be shifted by primitive data shifts between banks or pages. The orphan item sending in optimized mode can be parallel if there are more than 2 pages in the shift. For example, if there are orphans in three different memory units ("bank 1", "bank 2" and "bank 3"), orphans may be sent in parallel (substantially simultaneously) from bank 1 to bank 2, from bank 2 to bank 3 and from bank 3 to a further bank ("bank 4"). This is three times faster than shifting the orphans between banks one-by-one.

In summary, the buffer gives several advantages:

It reduces the data pipe costs in the memory module

It reduce the need for wires between memory banks and pages

As described in section 5.3, each row of the memory portion 231 is effectively a neighbour of every other row, which speeds up the row shifting We can use current physical memory technologies to perform shift functions, which reduces research and production costs We can use more sophisticated optimized shifts to speed up the shifting

6 Addressing and Assembly Instruction

Here we define new CPU instruction ("MOVX"), which can be sent by the CPU to the memory unit. The addressing is different inside the shift memory module.

If the embodiment uses parallel shifting, the shift switch sign is sent in the same moment, so the embodiment uses a special circuit.

The special moving address could be of different formats, such as:

{1} MOVX source start address, target address, size; or

{2} MOVX source start address, source end address, target address; or

{3} MOVX source start address, size, step

Note that the operands may be in any order. As can be seen, the size operand is calculable from the end and start address, so the forms are equivalent.

The addressing circuit is different in every technical solution.

The most simple the direct solution where the input the start and end address and the output is separate lines for all of the memory cells which give instruction to move the cell or not.

It is a simple demultiplexer circuit.

For the easier hardware design there is just the third form {3} is a circuit, because the {1} and {2} could create shift composition which is not available in every CPU design.

In this case the step could be just special values which means primitive shifts in the dimensions. So the software compiler/operating system should create a list (or loop) to achieve a shift composition.

7. Special Neighbours and their Benefits

In certain applications of the embodiments, the performance can be improved by creating special neighbourhoods between cells, i.e. adding additional data pipes.

Example 7.1

In a distributed CPU architecture, the CPU(s) and the memory may be in the same circuit (i.e. not spaced apart by a bus, but instead connected directly) and it may be possible to arrange that some or all data items (e.g. words or lines) are connected to corresponding data items in the CPU(s) cache or inside a data structure directly. This means the CPU can read/write data directly from the memory, which could speed up the distributed calculations, avoiding the need for a data bus which may force the CPU to wait. This concept is very effective solution for e.g. FPGA technology, which has the same bottleneck problem with memory.

Example 7.2

Sometimes a memory has to represent multiple tables. For example, a single video memory (see section 9 below) may be used to provide data for several huge screens. In this case, it may be advantageous to provide additional data pipes directly linking cells which store data for different screens, so that a motion of an image from one screen to another is as smooth as a motion within the screen effected by the shift memory.

Example 7.3

Even if the computer system which is an embodiment of the invention uses current data bus technology, much faster data handling is possible if the data bus can simultaneously (that is, in parallel at substantially the same time) transfer a complete line. For this purpose, memory data lines may be provided connected directly to a line of data items. So if the CPU asks for continuous data from the memory, the memory controller 31 could read whole lines in one step and send them through the data bus (and optionally write back to the memory immediately) and the memory controller 31 can also perform write options for a whole line simultaneously, instead of doing time consuming processes to handle read/write operations word by word.

8. A Further Function which can be Performed by a Shift Memory

The pipeline circuitry which is provided to enable the shift memory to operate can also be used to implement a further function, referred to here as a "fill function", in which the same data value is written into a plurality of data items. Conventionally, if it is required to write a certain value (e.g. 0) into all data items of a large memory (e.g. a 1 GB memory), it is necessary to transmit the value 0 through the data bus for each data item (i.e. one billion times). By contrast, the shift memory may be operative to perform this function in a single operation.

The command to the shift memory may have the format:

SETX start address, size, value where "SETX" represents a command which is recognised by the controller 31 of the memory unit, "start address" is the address of first data item where the value is to be written, "size" indicates how many consecutive data items the value is to be written to and "value" indicates the value which is to be written to all of those data items. Thus, again, there is a vast reduction in the amount of data which the CPU has to send to the memory unit.

Of course, in other embodiments the data fields accompanying the SETX command (referred to as "fill data") may have a different format from that given above (e.g. specifying an end address instead of a size).

In the case that the memory unit includes a buffer, it may be convenient to perform the fill operation by filling some or all of the data items in the buffer with that value and then copying the value from the buffer into the data items of the memory as often as required. This may allow whole lines of memory cells to be written to at once. We could set that value in one step for a whole line.

9. Particularly Suitable Applications of Shift Memory

One particularly suitable application of a shift memory is as a video memory. There are particular occasions encountered in using a video memory for which the shift memory is particularly suitable, to speed up operations. One of them is view shifting.

Example 9.1

Figure 28:
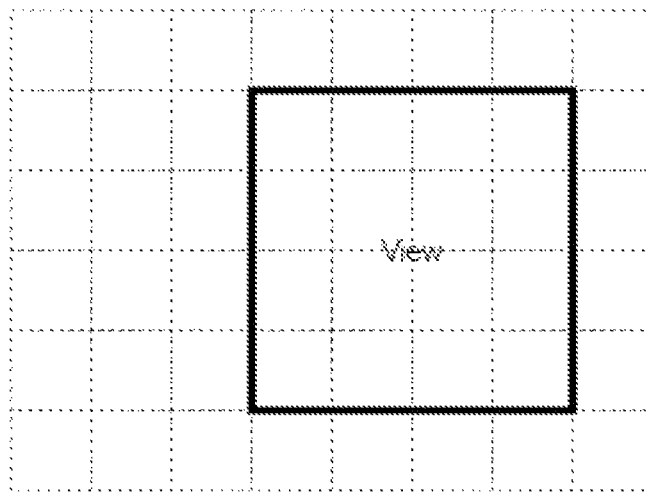
FIG. 28 illustrates a known process of producing a view of a virtual environment according to a virtual viewpoint.
Figure 29:
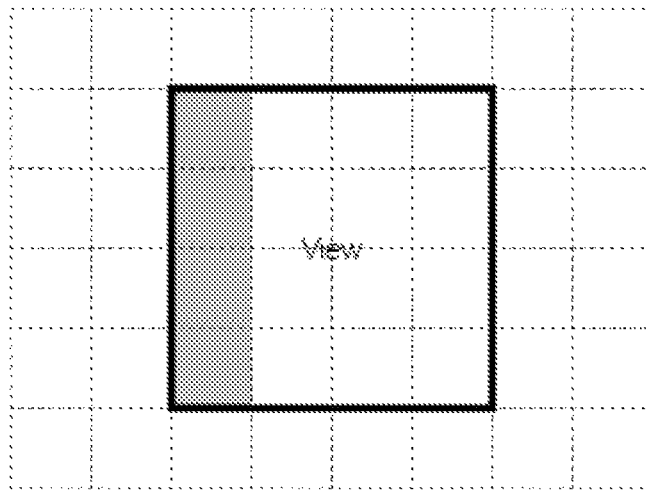
FIG. 29 illustrates the computational task to be performed when the viewpoint changes.

In some video memory applications, a video card creates a view of a virtual environment, which is viewable in a screen or VR/AR headset. The virtual environment is imaged from a virtual viewpoint which has a location and an orientation in the same virtual space as the virtual environment. This is illustrated in FIG. 28. When the viewpoint moves, the video card has to change the view of the environment correspondingly. If the video memory is implemented as a shift memory which is an embodiment of the present invention, this memory shifting may be very fast. The GPU/CPU does not have to instruct the motion on the level of individual data items in the video memory. Instead, it just calculates the data which is to be inserted into any newly viewed area of the environment (e.g. an area of the environment which was not previously visible to the user, but which becomes visible due to the motion of the viewpoint). For example, as shown in FIG. 29, in the case of a horizontal movement of the viewpoint, data may be required to fill just the shaded area. The data representing such a new area is typically of minimal size compared to the whole view. Thus, the shift memory permits the video memory to react more quickly to motions while still using the same GPU. Furthermore, for the reasons explained earlier, it uses less energy. Since, for a 2-D matrix of data items, a given data item may have neighbours which are spaced from it in different respective directions, the shift memory may conveniently be used to handle virtual motions in multiple orthogonal directions (e.g. vertical motions as well as horizontal motions).

Example 9.2

If there are multiple GPU cores and an embodiment of the invention is used as a shared scratchpad memory, it is possible to make direct connection between the shared scratchpad memory and the GPU cores to speed up the memory access.

Example 9.3

Another particularly suitable application of a shift memory which is an embodiment of the invention is for video and sound editing. Such editing systems often require copying/pasting of new data segments into video or sound files and this requires that much of the file has to be moved in the memory which stores it. This process will be simple and fast if that memory is a shift memory and so are operations of deleting segments.

In current video card technology, an area of the memory is designated to correspond to the screen and once that area the memory has been populated with data, the data is transferred to the screen (a screen update step). Subsequently, a new screenful of data is created in the memory from scratch and that is transferred to the screen in the next screen updated step.

By contrast, using a shift memory which is an embodiment of the present invention, a previously created picture can be re-used. A possible process is as follows:

Step 1: Create layer 1
Step 2: Set layer 1 to be active (i.e. transfer the data from layer 1 to the screen)
Step 3: Copy from layer 1 to layer 2
Step 4: Recalculate only modifications in layer 2 (e.g. to provide a next step of an animated sequence)
Step 5: Set layer 2 to be active.
etc.

Steps 3 and 4 make it possible to re-use a large number of previously calculated pixel values.

2) DESCRIPTION FOR DISCLOSURE 2

Field of the Invention

The present invention relates to a memory unit, such as a single integrated circuit. It further relates to a processing unit for interacting with the memory unit, to a computer system incorporating at least one memory unit and at least one processing unit and to the respective operating methods implemented by the memory unit, the processing unit and the computer system.

Background of the Invention

A conventional digital computer system according to the von Neumann architecture includes at least one central processing unit (CPU) including a processing unit, a cache memory and a control unit; a memory for storing both data and instructions; external mass storage; and input and output mechanisms.

Figure 30:
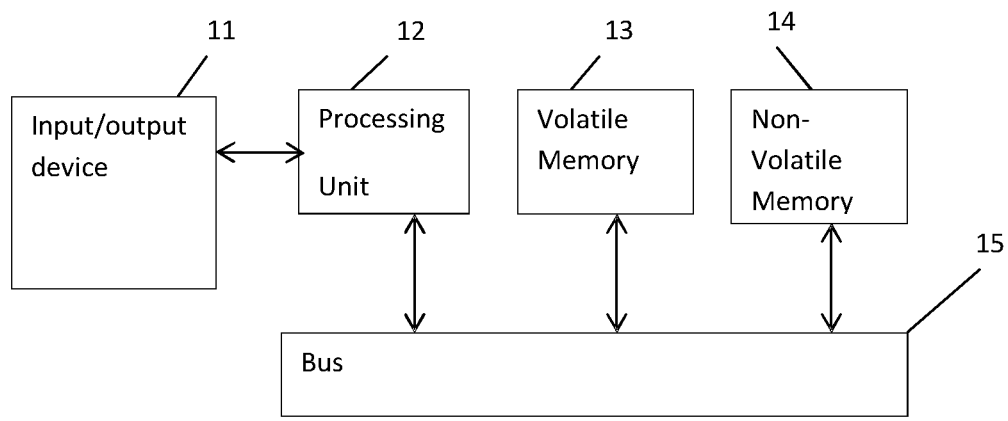
FIG. 30 shows schematically a conventional computer system.

More particularly, a conventional computer system as illustrated in FIG. 30 includes at least one input/output device 11 (for simplicity, only one is shown in FIG. 30) and at least one processing unit 12. Again for simplicity, only one processing unit 12 is shown in FIG. 30, but the computer system may have any number of processing units 12, which may be CPUs or cores. The computer system also includes one or more memory units of the same or different types. As depicted in FIG. 30, it includes a volatile memory unit 13 and a non-volatile memory unit 14. Each of these memory units includes memory cells which collectively define a memory and control circuitry for performing read/write operations. Communication between the processing unit(s) 12 and the memory units 13, 14 is via a bus 15. Conventionally, the bus 15 is partitioned into three sections: an address bus, a control bus and a data bus. When the CPU needs to read/write any data from/to the memory units 13 or 14, it uses the address bus to send the memory units 13 or 14 an address of that data in the memory. The control bus carries a command indicating to the memory unit whether the CPU wishes to read or write data. If the CPU is writing data, the CPU transmits the data on the data bus and the memory unit writes the sent data into the memory cells specified by the address. If the CPU is reading data, the memory unit reads the memory cells specified by the address and sends the stored data to the CPU 12 through the data bus 15.

Figure 31:
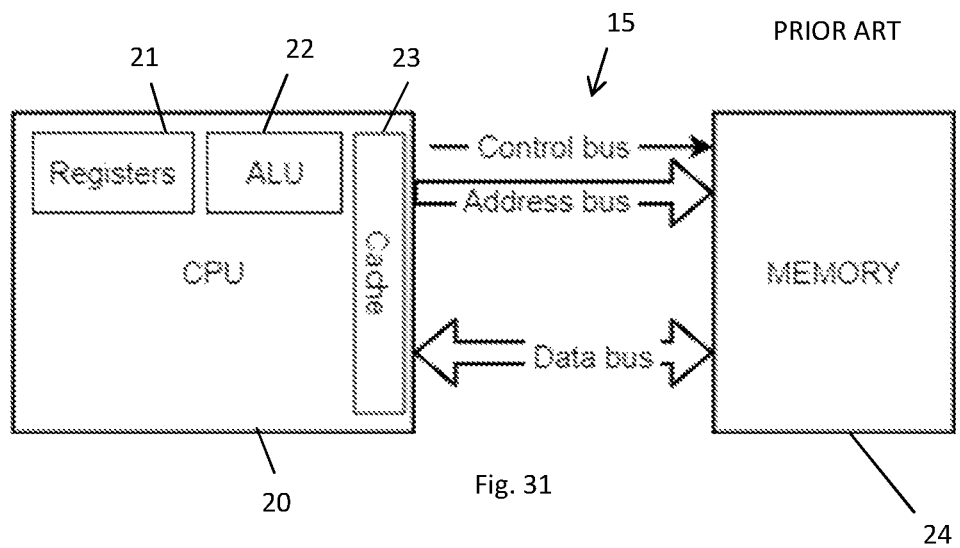
FIG. 31 shows schematically the construction and interaction of a processing unit and a memory unit in the conventional system of FIG. 30.

Since the bus provides a limited data throughput and since each memory unit 13, 14 takes some time to operate, it is known for CPUs such as the processing unit 12 to contain a memory cache which stores the last used, or often used, data, so it that is unnecessary to retrieve it from the memory units 13/14. FIG. 31 shows schematically the construction of a processing unit 20 which may be used as the processing unit 12. The processing unit 20 includes registers 21, an arithmetic logic unit (ALU) 22 and a cache memory 23. It further typically includes a control unit (not shown). FIG. 31 also illustrates the communication between the processing unit 20 and the memory unit 24, which may be either of the memory units 13/14 over the bus 15.

Typically programmers are not aware in detail of how data is stored in the memory units 13, 14. Instead, they define data structures (e.g. giving them names) and they write programs in a programming language to manipulate those data structures. A compiler optimizes the code and a cache analyser of a processing unit which implements the code tries at runtime to optimize the data communication between the CPU 12 and the memory units 13, 14. The cache analyser may be a portion of the operating system, or of the CPU cache controller.

Figure 32:
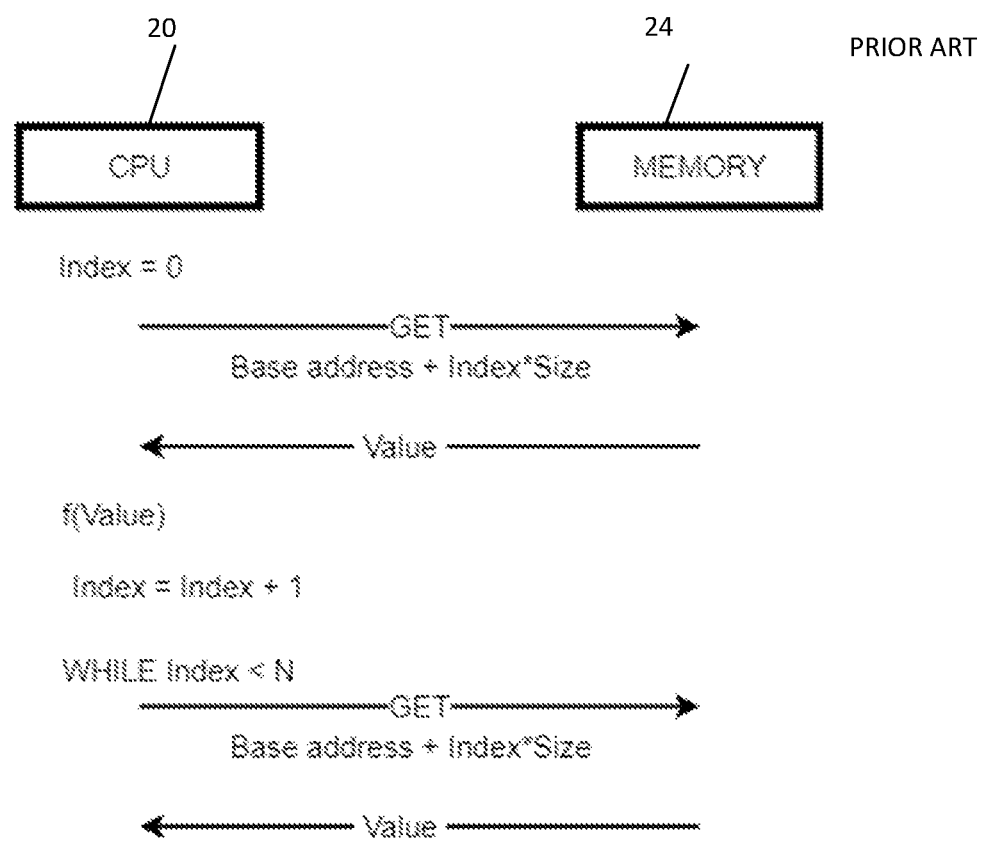
FIG. 32 illustrates a data read operation performed in the conventional system of FIG. 30.

FIG. 32 illustrates a process in which the CPU 20 performs a certain function on an amount of data of size N stored in the memory 24. The process uses a variable "Index" having an initial value of 0 and includes N successive steps. In each step, the CPU 20 sends the memory 24 a "GET" command. Each GET command includes a memory address which the CPU calculates and which is a base address (a start position in the memory) plus the current value of Index times a value ("Size") which indicates the amount of data which the memory address can write through the data bus at once. The memory 24 responds to the command by transmitting the data ("Value") stored at the memory address. The CPU 20 then carries out the function (denoted "f(Value)"). At the end of each step Index is increased by 1 and if Index is less than N then the process then proceeds to the next step. This is a computationally wasteful process. While the CPU 20 is working on the f(Value) calculation, the memory 24 is idle. Furthermore, while the memory 24 is retrieving and transmitting data, the CPU 20 is idle. In a "big data" application, the number of GET commands can run into the billions, so the delay is very significant. Furthermore, the amount of data read/written is much greater than the capacity of the cache memory 24, so all the efficiency improvements obtained from the CPU 20 having a cache memory are lost.

SUMMARY OF THE INVENTION

The present invention aims to provide a computer system, as well as a memory unit and a processing unit (e.g. a CPU or a core) for such a computer system and new and useful methods performed by the system and/or the units.

In general terms, the invention proposes that a memory unit is operative to receive from a processing unit a read command including an address in the memory and a plural number N of data elements which are to be successively transmitted by the memory unit over a data bus. The memory is operative to calculate a plurality of successive memory address locations, successively read data elements from the calculated memory address locations and to transmit them over the data bus to the processing unit. Since the calculation of the successive memory locations is performed by the memory unit, rather than by the processing unit, the process may continue even when the processing unit is otherwise occupied (i.e. simultaneously performing an another calculation using previously transmitted data). The processing unit preferably includes a data queue which is operative to receive data at a time when the processing unit is performing other (e.g. unrelated) operations. Thus, the operation of the processing unit does not have to suspend operation until data it has requested is received.

Furthermore, since the processing unit does not have to perform so many address calculations, the power of the processing unit can be employed for more advanced programming tasks.

Furthermore, the total number of commands which the processing unit has to transfer to the memory unit may be reduced compared to the known system described above (perhaps to just one command) and made independent of N. Thus, the data bus is in use for a greater proportion of time, or from another point of view the memory unit is able to transmit more data during a given amount of time.

For both these reasons, the overall speed of the computer system is improved. This is particularly true in a situation in which parallel processing is implemented.

As well as speeding up the overall computer system, the reduction in the number of messages transmitted in the system compared to a conventional system makes possible a reduction in energy consumption, so a computer system according to the present invention can generate less heat.

Furthermore, whereas in the conventional system described above, a complex optimisation process is typically performed at run-time to coordinate the processing unit and the memory unit, an embodiment of the present invention may be designed in a simpler way, since the timing of the operations of the memory unit and the processing unit may be made largely independent.

Note that an embodiment of the present invention can use any form of memory unit, including a slow non-volatile data storage device, which conventionally has slow data handling. Since the present invention is not specific to any type of data cell, it can be used in any computer system or network. The data bus is operative to transmit data transmitted by the memory unit to a data queue accessible by the processing unit. The data queue is preferably provided as a cache inside the processing unit. Whereas, in the known method of retrieving data from the memory (e.g. as described above with reference to FIG. 3), a contiguous portion of the memory space is written to the cache, an embodiment of the invention may make it more convenient for the memory unit successively to select data elements from different parts of the memory space and write them to the data queue. For example, if the memory space contains a complex data structure containing numerous sections and the program of the CPU needs to access a certain portion (e.g. an initial portion) of each section, a conventional method would typically write the whole data structure to the cache, use the desired portion of each section and delete the rest. By contrast, in an embodiment of the present invention the memory unit may be controlled, by commands from the processing unit, to transmit only the desired portion of each section to the data queue.

Preferably, the memory unit is further operative to receive from the processing unit a write command including a position value which specifies an address in a memory and a cardinality value specifying a plural number N of data elements which the memory unit is to successively transmit over the data bus. The memory is operative to calculate from the position value a plurality of successive memory address locations in the memory, to successively obtain the data elements from the data bus and to store the data elements in the respective memory address locations.

In a co-pending patent application, the present inventors have proposed a "shift memory". This is a memory unit (e.g. a single integrated circuit) which stores data at a plurality of locations ("data items") in a logical memory space, such that each data item has an address given by at least one index variable. In addition to standard read and write commands, the memory unit is operative to receive a shift command in a predefined format and including shift data which indicates a source address in the logical memory space. Upon receiving the command, the memory unit is operative to recognise it as a shift command and accordingly perform a predefined shift function comprising (i) using the source address to identify a portion of data in the memory space and (ii) writing that portion of data to a different location in the memory space. Thus, the portion of data can be shifted within the memory space without a need to transfer the portion of data along the bus. In preferred forms of the shift memory, the memory unit is provided with a buffer which is in communication with a data bus. Buffer elements of the buffer may be provided with direct data communication paths to respective groups of the memory cells in the memory space, such that each of the memory cells is connected to one of the buffer elements and can transfer data to/from it using a shift operation. In one possibility, the memory unit of the present invention may be implemented as a shift memory.

A first specific expression of the invention is a memory unit for a computer system, the memory unit comprising physical memory cells arranged to store respective data elements and collectively to define a memory space;
  the memory unit being configured upon receiving a read command (SEND) including a base address and indicating an amount of data, to perform:
  (i) an address calculation operation of successively calculating using the base address a sequence of memory addresses in the memory space, the number of memory addresses in the sequence depending upon the amount of data,
  (ii) a data extraction operation of successively extracting data from the memory space based on the successive calculated memory addresses and
  (iii) a transmission operation of successively transmitting the extracted data out of the memory unit. The address calculation operation, data extraction operation and transmission operation are typically performed concurrently.

The memory unit is preferably also configured to perform conventional read and write operations. That is, it is configured:
  upon receiving a second read command (i.e. a read command in another format from the read command discussed above) including a read address in the memory space, to transmit out of the memory unit, data stored at the read address; and
  upon receiving a write command including (i) a write address in the memory space and (ii) one or more data elements, to write the data elements to data items at the write address.

Alternatively the invention may be expressed as a computer system including the memory unit, or as a processing unit for the computer system, or as methods performed by the memory unit, the processing unit or the computer system as a whole.

Figure 33:
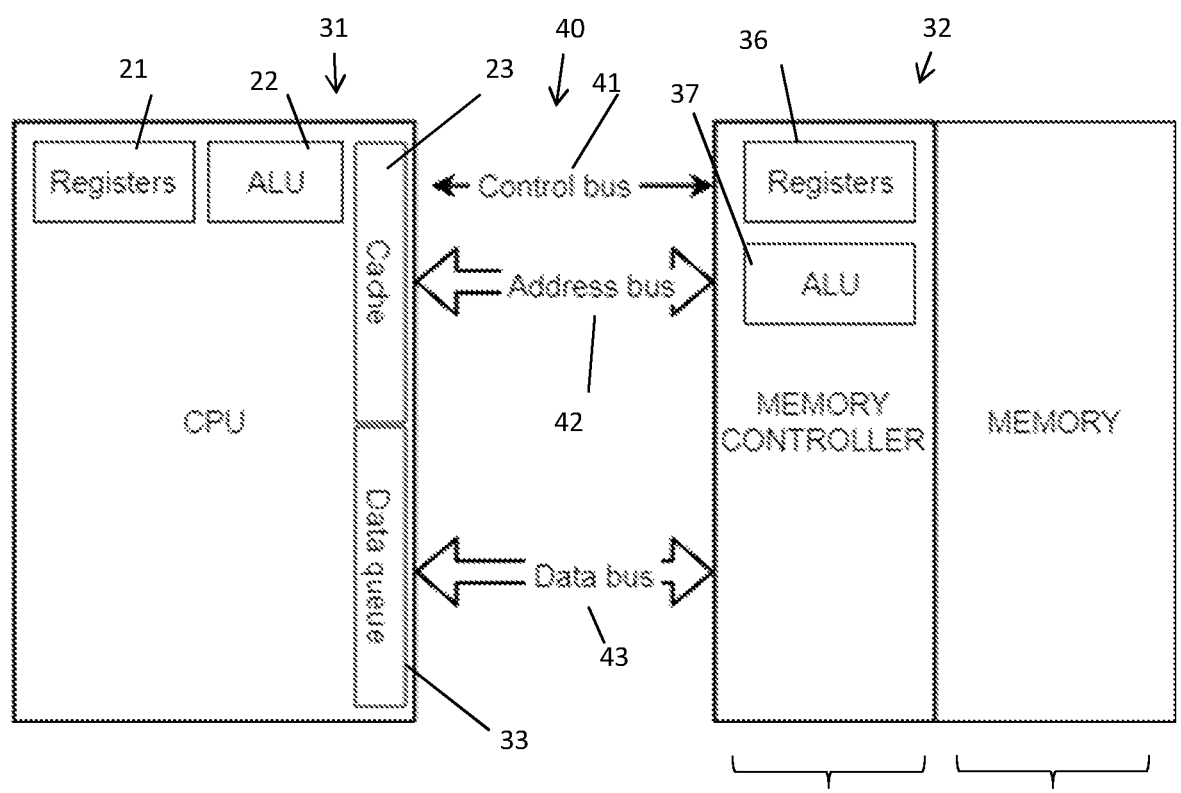
FIG. 33 illustrates schematically the construction and interaction of a processing unit and memory unit in a computer system which is an embodiment of the invention.

One embodiment of the invention is a computer system which has the same general structure as the conventional system shown in FIG. 30. Again, it may have multiple processing units 12 which may be CPUs and/or cores, but in much of the following text we will consider an example in which there is only one processing unit 12, which is a CPU. In contrast to the conventional system, in the embodiment each of the processing unit(s) 12 has the structure of the processing unit 31 shown in FIG. 33 and at least one of the memory unit(s) 13,14 has the structure of the memory unit 32 shown in FIG. 33. The CPU 31 includes registers 21, an algorithmic logic unit (ALU) 22 and a cache memory 23 which are equivalent to those of a known processing unit 12 and are accordingly given the same reference numerals. Additionally, the processing unit 31 includes a data queue 33. The data queue 33 is capable of storing data transmitted to it either from other units of the CPU or over the data bus portion of a bus 40. The data queue 33 may be implemented as a FIFO (first-in-first-out) memory.

In contrast to the bus 15 of the conventional system of FIG. 31, the bus 40 includes a bi-directional control bus 41 and a bi-direction address bus 42 (in the conventional bus 15 these are uni-directional, or at least are always used uni-directionally). The bus 40 further includes a bi-directional data bus 43. The memory unit 32 includes two sections: a memory controller 34 and a memory 35. The memory 35 may be constructed as in a conventional memory unit, being made up of a number of memory cells arranged in groups, where each group of memory cells has a respective address. In contrast to a conventional memory unit, the memory controller 34 of the memory unit 32 includes a plurality of registers 36 and an ALU 37. As discussed below, the memory controller 34 may include a data queue (not shown). Furthermore, the memory unit 32 may be configured to function as a shift memory which, in response to a shift command received on the bus 40, is able to move data from one location in the memory 35 to another.

The processing unit 31 employs the data queue 33 for read/write operations involving an amount of data greater than a size criterion. The purpose of the cache 23, as in a conventional system, is to recall data which has been recently used or which is frequently used (according to some criterion). It is not used for the read/write operations having a size meeting the size criterion and thus the data in the cache 23 remains useful even after such read/write operations have been carried out. The cache 23 may for example be useful for random readings of program instructions from one of the memory units 13/14 which stores program instructions. To simplify the production process of the processing unit 31, the same memory cell technology may be used to implement both the memory cells of the cache 23 and the data queue 33. However, the embodiment is not limited in this respect.

Note that in a variation of the embodiment, the cache and the data queue may in fact be implemented with the same memory cells; the functionality of these memory cells may be controlled, e.g. by a hardware switch, to determine whether the memory cells act as a cache or as a data queue.

Figure 34:
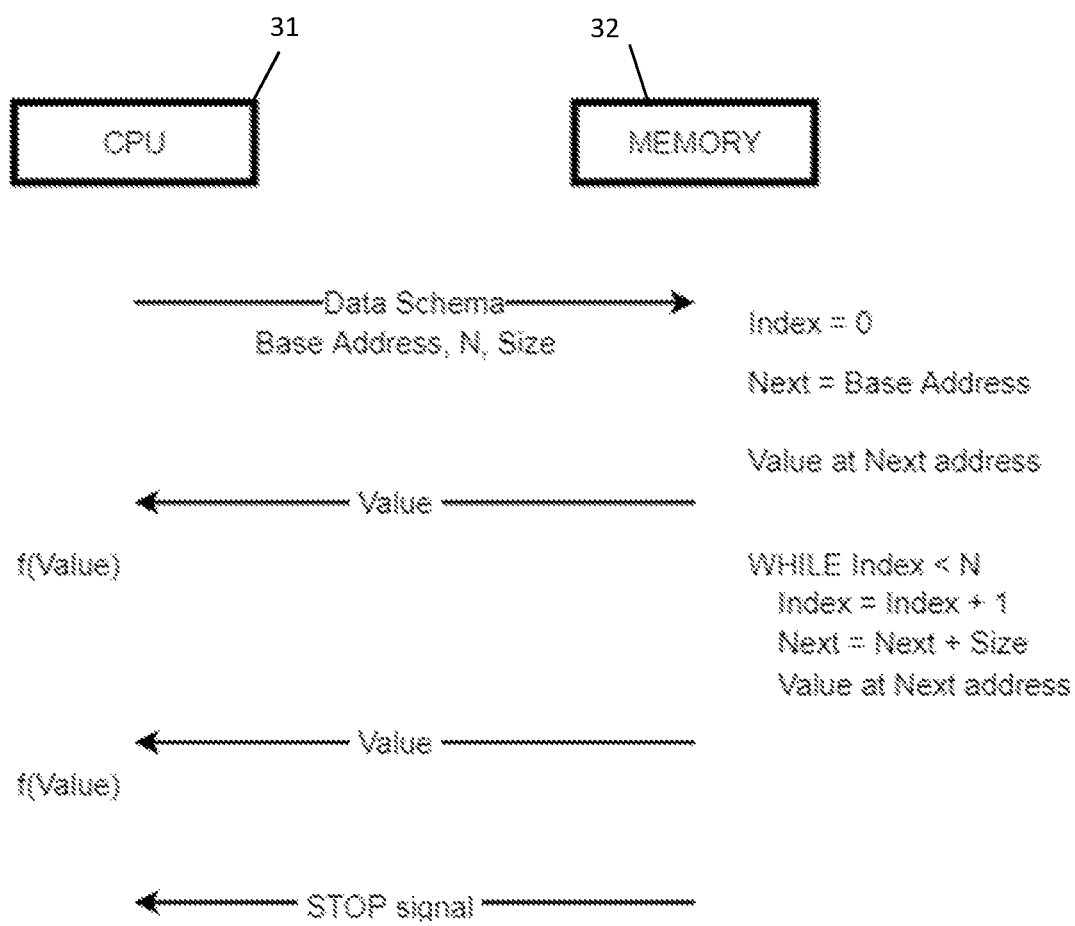
FIG. 34 illustrates a data read operation performed in the embodiment of FIG. 33.

FIG. 34 illustrates schematically a memory read operation performed by the processing unit 31 and memory 32.

An initialisation phase of the read operation is performed by the CPU 31 sending a message to the memory unit 32 comprising a START signal and a "Data Schema". The START signal may be sent on the control bus. The Data Schema has the following components: a base address indicative of a start position of a set of data elements in the memory 35 and a cardinality value indicating the number N of data elements which are to be read from the memory, a "Size" value of each of the N data elements (this may for example be the number of bits which can be simultaneously transmitted on the data bus). Optionally, the base address may be sent using the address bus 42 and the cardinality value N and Size value may be sent using the data bus 43. Together the cardinality value N and the size value indicate an amount of data which is to be read from the memory 35.

The memory controller 34 performs a set of N steps (a "loop"). In each step of the loop, the memory controller 34 performs three sub-steps: (i) the memory controller 34 calculates a memory address in the memory 35 and sets a value Next to be equal to this, (ii) the memory controller 34 obtains from the memory 35 the data element ("Value") stored at the address Next and (iii) the memory controller 34 transmits it over the data bus to the data queue 33 of the CPU 31, where it is stored. The calculation sub-steps are referred to here collectively as an "address calculation operation". The sub-steps of obtaining data from the memory are referred to collectively as a "data extraction operation". The sub-steps of transmitting the extracted data are referred to collectively as a "transmission operation". Thus, these three operations are interleaved.

One way of performing these operations is as follows, illustrates in FIG. 35. The memory controller 34 employs a variable "Index" which is initially set to zero (61). When the sub-step (i) is first performed, the variable "Next" is initially set to the base address (62). Sub-step (ii) is performed by extracting the data at the address Next in the memory 35 (63). Sub-step (iii) is then performed by transmitting the extracted data to the data queue 33 of the CPU 31 over the data bus 43 (64).

It is then determined whether Index is less than N (65). If so, Index is increased by 1 (65). Sub-step (i) is then performed by the memory controller 34 setting the value of Next to be Next+Size (67). Sub-step (ii) is performed by extracting the data at the address Next in the memory 35 (63). Sub-step (iii) is then performed by transmitting the extracted data to the data queue 33 of the CPU 31 over the data bus 43 (64).

If the determination (65) is negative, the memory controller 34 sends a STOP signal to the CPU 31 over the control bus 41. The read operation is now over.

Figure 35:
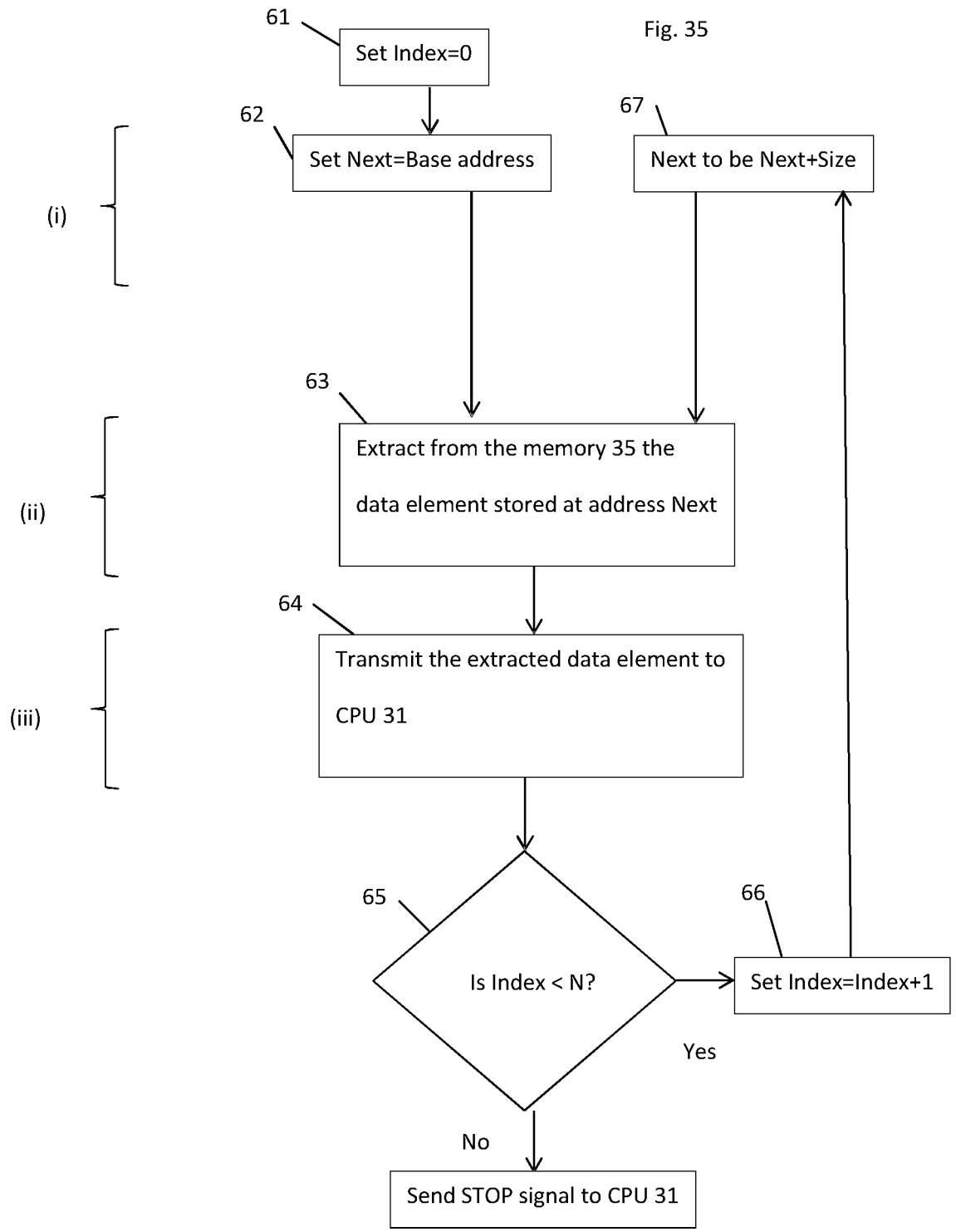
FIG. 35 is a flow diagram of the process of FIG. 34.

In parallel to the process of FIG. 35, the control unit of the CPU 31 successively reads the data elements ("Value") from the data queue 33 and for each calculates a corresponding function (denoted "f(Value)"). The timing of the control unit of the CPU may be independent of the functioning of the memory unit 32, except that the data elements (Value) must be received by the data queue 33 before they are operated on. Upon receiving the STOP signal the control unit of the CPU is alerted to the fact that the data queue 33 has received all the requested data elements.

Since the f(Value) calculations and the calculations by the memory controller 34 of the addresses of each data item are performed in parallel, data items can be transferred to the CPU earlier than in the known method explained above with reference to FIG. 3. Each data element can be transmitted by the memory unit 32 without waiting for CPU 31 to process the preceding data element. Additionally, the CPU 31 can focus on performing the calculation f(Value), so the instruction cache of the CPU 31 will be simpler and more easily optimized.

Although in the explanation above, the address calculation operation, the extraction operation and the transmission operation are interleaved, in principle in a variant of the embodiment they could be performed one after the other. First, the memory controller 34 could calculate all the addresses and store them (the address calculation operation). Then it could extract the data at the calculated addresses in the memory 35, putting it into a data queue of the memory controller 34 (the data extraction operation). Then it could transmit the stored data from the data queue to the CPU 1. This variant is not preferred, since it requires additional storage space (e.g. for the calculated addresses) and furthermore means that the CPU 31 has to wait for longer until receiving the first data from the memory 35. However, it illustrates that various timings are possible for the address calculation operation, the extraction operation and the transmission operation.

We now turn to a more general explanation of the embodiment and of additional optional features of the embodiment.

1. BASIC DEFINITIONS

1. Hardware Data Type

We use the term "data element" to refer to an item of data (e.g. if data is transmitted as a stream, the term "data element" may refer to the data which is being transmitted at any instant) and this data element has a "data type" which means the structure of the data element. As in a conventional computer, in the embodiment the hardware architecture defines a basic "hardware data type". Usually this is termed a "word" of the hardware architecture, which may be a single byte or multiple bytes.

2. Primitive Data Types

Primitive logical data types ("primitive data types") are defined based on the hardware data types. For example, one primitive data type may be a character, an integer, a floating point number, a pointer etc. Specifically, we can define:

A. Essential Data Types

Some of the primitive data types correspond exactly to a single hardware data type. For example, the integer and floating point data types are usually each implemented as a word in the hardware architecture, although the processing unit 31 uses them in different ways to do calculations.

B. Extended Data Types

Some primitive data type are a composition of two contiguous (i.e. concatenated) hardware data types (or another small number of hardware data types). For example, one primitive data type may be a double-resolution floating point data type, which is implemented as two contiguous words.

C. Snippet Data Types

Some of the primitive data types may be just a part of one hardware data type. For example, one primitive data type ("a short int") may be defined as a half of a word; similarly, if we define a primitive data type which is just one byte and if the hardware data type consists of multiple bytes, then this primitive data type may be implemented as just a portion of a hardware data type. Similarly, a primitive data type which is a single bit or Boolean value may be just a bit of a hardware data type.

Some computer systems store a small amount of data together as a fraction of a hardware word, e.g. 4/8 bytes, or 32/64 bytes. The embodiment can be arranged to handle these cases, but usually snippet data is stored separately or together in a word.

3. End of Data (EoD), NULL The embodiment may use a special primitive data value which could mark the end of a sequence of primitive data types. For example, the special primitive data value may be zero in the case of null-terminated-strings in C, or ASCII 4 for DOS text files. The embodiment may also use the NULL as a pointer which shows nowhere. The NULL is often is the end of chained data.

4. String

A String data type a finite sequence of characters. Many different storage strategies are known for them, but the embodiment may not take these into account. A String always has a beginning, an end and a Size. The Size may be pre-defined, or it may be specified, e.g. by indicating the end of the String with an EoD data value.

Note that a String may be empty.

In some data representations, the String size defines the maximum amount of data which can be stored in the string (i.e. the data storage capacity), but not all of this capacity is actually used. In other words, the physical size (capacity) is different than the Size of the actual data of the String. When performing the address calculation the embodiment uses the capacity, but preferably in the embodiment the read/write operations only relate to the part of the capacity which is actually used. For example, the string may include a "family name" field with a maximum length of 50 bytes, so the compiler arranges for the string to be stored in the memory 35 with 50 bytes available for storing the family name, but at runtime the data stored there may be less than 50 bytes and preferably a read operation on the family name only transmits through the bus 40 the useful data actually stored.

5. Stream

A stream is a sequence of primitive data types. It may be be made available over time. The main difference between a string and a stream is that a stream may be unfinished (i.e. not comprise a value defining an end) or even "infinite" (which means it will write later if we reached at this end). Examples of streams would be a "timeline" of posts on a social media site, or a stream of GPS data transmitted to a driver, or stream of stock exchange data. The embodiment typically has no information in advance indicating how much data will be transmitted, or when it will arrive, or when it will finish. In certain applications it is important than none of this data is lost (e.g. an emergency situation in an aeroplane).

6. Structure, Structured Data, Members

The embodiment can be used to store data in various ways, e.g. storing multiple primitive data elements together, or storing primitive and structured data together. A compiler of a program may optimize this process.

For example, suppose that three bytes of data are to be stored. A first way of doing this would be by storing each byte in a respective word of the memory 35. So, three words are needed. If each word is 32 bits (4 bytes), then a total of 3 bytes of the memory are storing useful data and 9 bytes of the memory (i.e. 3 bytes in each of the three words) are wasted. If each word is 64 bits (8 bytes), then again a total of 3 bytes of the memory are storing useful data, but 21 bytes (i.e. 7 bytes in each of the three words) are wasted. An alternative way of storing the three bytes of data would be to store all three bytes in one word. Thus, if each word is 32 bits (4 bytes), then only one byte of the word would be wasted. If each word is 64 bits (8 bytes), then only 5 bytes of the word would be wasted.

In another example, suppose it is desired to form a data structure which is B1 (a single byte), W1 (a word), B2 (another byte). This could be stored in three words of the memory. Alternatively, some compliers are configured to store the bytes B1 and B2 in one word of the memory space and W1 in another word of the memory space, thereby reducing the amount of wasted space.

7. Base Address

The following explanation uses the term "base address" in the same way that it is conventionally used. That is, as a starting address of a data structure in the memory 35. The embodiment may use any mode of the addressing (e.g. based on pages, or otherwise).

8. Offset

The following explanation uses the term "offset" in the same way that it is conventionally used. That is, as a position or address modificator offset from a base address. It is an integer which could be 0 or even negative. The offset is always used to define a position relative to a base address. The embodiment mainly uses offsets to define a data element within a structure having the base address as a starting position.

9. Size

The following explanation uses the common meaning of the term "Size". Size is integer and should be greater than or equal to 0. Size=0 is a special case and may be an important one in the embodiment. Various different sizes are important in the embodiment:

A. Primitive Data Size

This is typically a size which is a number of words or bytes.

B. Structure Size

This is the sum of the size of data types within a data structure.

C. Capacity Size

Sometimes, as mentioned above in relation to strings, the system stores data in an area of the memory 35 with a higher capacity than the amount of data which is stored.

D. Used Size

A data structure may contain non-contiguous data. e.g. strings which are stored outside the structure itself. The term "used size" means the sum of the sizes of all the data stored in the data storage/memory.

E. Stream Size

The size of a stream may be defined as the size of the all of the data or just a reachable (retrievable) part of it.

10. Index

We use the term "Index" in its common meaning. The Index is a variable which labels the elements of a contiguous data flow. Index is an integer and may be zero. Usually the Index and the Offset are proportional, when the data reach (i.e. data retrieval) is direct and all the data items have the same size (specifically, Offset=Index*Item_Size). However, the Index is not always just proportional to the Offset, e.g. a String array may contain a pointer, but in the calculation we want to use Index to find the address to which the pointer points.

11. Counter

We use the variable "Counter" to set how many Items should be sent between the CPU and the memory.

12. Pointer Type

A pointer is a memory item whose value refers to (or "points to") another value stored elsewhere in the memory. The pointer contains the memory address where the other value is stored. In the embodiment pointers may be important in implementing memory levels. The operation of the pointers will be handled in the memory controller 34. If the data schema table generated by the CPU 31 specifies that any data word is a pointer (i.e. it specifies that the data element has a "pointer type"), the memory controller 34 will use that data element as a pointer. Alternatively, if the CPU 31 specifies that the data word is a normal word, the memory controller 34 may treat it as normal data. In other words, the "pointer type" is an instruction to the memory controller 34 to use the data element as a pointer.

A pointer is stored in a recognisable format as a normal data word, so that if the CPU 31 asks the memory unit 32 for data at an address which stores a pointer, the memory controller 34 can retrieve the value pointed to and transmit it to the CPU 31. If the CPU 31 wants to read a pointer from the memory 35 (i.e. to retrieve the value of the data element which acts as a pointer, rather than the data which is pointed to), it sends a read command which specifies that the data type is a word. The memory controller 34 in response sends the pointer to the CPU 31. This means that the CPU is able to read a data element of the pointer type, or manipulate it by a write operation, without making use of the ability of the memory controller 34 to handle pointers differently from other data elements.

13. Cache

The CPU's cache 23 contains previously used data elements retrieved from the memory unit 32 and thus mirroring part of the main memory 32. It is a very small memory, but it takes the CPU much less time to read from the cache 23 than the memory 32. The cache 23 may be implemented as a special priority memory, which may store the most often reached or last used data elements retrieved from the memory 32.

14. Data Queue

The data queue 33 is another memory to/from which the CPU 31 and memory unit 32 can write/read data elements. Once data has been read, it cannot be read again. That is, whereas the cache 23 retains values after they are read from the cache 23, the data queue 33 removes them to make space for the next data element to be written there.

15. Thread/CPU/Core ID

A given CPU 31 of the computer system may run multiple threads and as noted above there may be multiple CPUs 31. Every thread/cpu/core has an unique ID, because the memory controller 34 serves more than one thread. As noted above, in the embodiment when a CPU 31 sends a read command to the memory unit 32, the memory controller 34 may send back multiple data elements (e.g. millions of data elements). However, it is undesirable if any CPU has wait until another CPU has finished a big data reading operation. So the memory controller 34 is preferably configured to implement simultaneously multiple memory blocks which are addressed to different threads/CPUs/cores.

16. Process State

In the embodiment, a process running in a CPU 31 sends requests to the memory controller 34. While it is doing this we say the process is in a "SEND state". After doing this, the process may be in a WAIT state, before it receives the first or next data. When the process has finished running (e.g. found a looked for item), the process state is FINISHED.

When the process is using the data in data queue 33/cache 23 without any stopping its state is referred to as RUNNING. If a first process is waiting for another process, the first process does not use the cache 23 or data queue 33 and its state is PAUSED.

It is possible that some data stored in the memory 35 is "dirty", for example that it is being modified by one process while another process is operating on it and may therefore be erroneous. In this case the process state may be modified to a DIRTY state. This DIRTY state may optionally take one of two possible values: DIRTY_PAST which means that the process has already operated on a data element in the memory 35 which has been modified by the other process; and DIRTY_NEW which means that the process is about to operate on a data element in the memory 35 which has been modified by the other process (e.g. the process has reached the $90^{th}$ element of a certain data structure and it is the $100^{th}$ element of the data structure which has been modified). Based on any of these states, the CPU 31 can decide to terminate the process, to restart the process or to continue with the process.

17. Process communications

We will now describe a number of signals which a process running in the CPU 31 may send (i.e. cause the CPU to send) to the memory unit 32 to modify a data transmission loop of the kind described above. Each of these signals should contain the thread/CPU/core ID, so that the memory controller 34 can identify which memory reading/writing operation should be modified.

It is possible that the CPU 31 may work faster than the memory controller 34, so the CPU 31 may send the memory controller 34 a START signal, to instruct the memory controller 34 to send more data. If a process has finished running, it sends the memory controller 34 a STOP signal, to instruct the memory controller 34 to stop sending more data.

Conversely, if the calculation by the CPU 31 is slower than the rate at which the memory controller 34 sends new data, the data queue 33 may soon become full. Upon determining that this is the case, the process may send a PAUSE signal to the memory controller 34, to suspend the data handling in the memory controller 34. To restart the loop of data transmission, the CPU could send a RESTART signal for the Memory Controller, which will react to it by restarting the data transmission loop.

To obtain just one data element the CPU 31 could, instead of a START signal, send the memory controller 34 a "STEP signal", which is a type of signal which instructs the memory controller 34 to just send one data element. A STEP signal may be useful when a program is being debugged to slow down the communication between the CPU 31 and the memory 32, or to optimize the data exchange to close a predicted STOP event.

18. Optimization Metrics

To optimize the CPU-memory communication the CPU 31 and memory 32 may share information about one or more communication metrics (i.e. values characterizing the memory transmission process). The CPU 31 and memory controller 34 can use the metrics to optimize the data exchange between them. For example, one metric may be an average size of the data in the data queue 33 which causes the PAUSE signal to be sent. Some metrics may describe the current state of the data queue 33 (i.e. how full it is, e.g. as a percentage of its capacity). Alternatively or additionally, other metrics may describe previous read processes. For example, the CPU may determine a characteristic of previous operation(s) including a read process (e.g. that previous search operation(s) have typically found a desired result within a certain number of data items, e.g. the first 100 data items) and use this to control a current read process (e.g. to pause a read process after the certain number of data items have been sent to the CPU 31).

19. Data Reach Table

Each command sent by the CPU 31 to the memory controller 34 includes a "data reach table" with a predetermined format and the entries in this table define the type of command it is. In the case of a read command, the data reach table tells the memory controller 34 how it should calculate the position of items. The CPU 31 sends this information at the initialization phase. (For simplicity the entire data reach table is not explicitly shown in FIG. 34).

20. Schema Table

The Data Schema table (see the example in FIG. 34; other examples are given below) contains the data item descriptions. These inform the memory controller 34 which data should be handled and how. The data reach table is a portion of the data schema table. Whereas the data reach table is information for the address calculation, the data schema table also gives information about what to do with the data (e.g. read all of them, read the first 100 etc.). The schema table is dynamic (i.e. it can be modified as the process it specifies is run).

21. Compiler, Optimizer

The communication with the memory controller may be optimized. A programmer who is writing a computer program for the computer system to perform knows which data will be used and this information may be transmitted to a compiler of the computer program using an API. Alternatively, the compiler may work this out for itself. In either case, the Data reach table and Schema table may be created at the time of compiling by analyzing of the code of the computer program.

22. Memory Area Cache

For some calculations, it is better for the cache 23 to store at least some of the data. For example, the cache 23 may be used to store part of a large data object, while the rest of the data object is put into the data queue 33. While the data queue 33 is ideal for sequential data, it may be better to use the cache 23 for matrixes or data objects having 3 dimensions or more. The cache 23 is designed to store neighbouring data elements of the data object together.

To implement this, the CPU 31 may be operative to generate and transmit a command to the memory controller 34 which causes the memory controller 34 to write each data element from the memory 35 to a selected one of the cache 23 and the data queue 33.

As a first example, for a matrix it may do so sequentially, as shown in FIG. 36. However, it may be better for the cache 23 to follow the structure of the data and not try to create on-the-fly a semi optimal reading. The programmer (or compiler) knows the data structure and the steps of the reading loop and accordingly may control the cache 23 to store the data as shown in FIG. 37, or in the sequential manner of FIG. 38.

As a second example, consider that the case that the CPU requires only a portion of a data structure stored in the memory 35. For example, the CPU may require only a single field from each of a set of sections of a data structure. Whereas conventional memory systems would have to transfer the entire data structure through the bus and into the cache 23, which means that the cache 23 stores data which will never be used, in an embodiment of the present invention the memory controller 23 may be operative to transfer a sub-set of the data structure to the cache 23.

The examples above are for the case of 2-D data structures (matrices), but data structures of higher dimensions may be handled in the same way.

2. Examples of the Operation of the Embodiment 2.1 Data Reach Table Syntax and Representation The Data Reach Table is an array of items. Every item may be an address, an attribute or a block. It may have the following structure including some or all of the following elements.

ID (this is an ID of the thread/CPU/core)
Mode (this is either Read or Write)
Base Address
Work address 1
Work address 2
Attributes for address calculation (e.g. array/link/FIFO/LIFO, sorted/unsorted)
Attributes for end of the data handling (e.g. EoD, calculation, number, stream)
Data for address calculation (typically item size, item count)
Offset
Type: (this may be any of word, words, string, pointer)
How should handle data, blocks: { }
Considering the example of FIG. 34, in the read command the Data Reach Table structure is as follows:
ID
Mode: Read
Base Address
Attributes: array
Data end: number
Data Type: word
Data size: Size
Item Count: N 2.2 The Use of Signals In the description of FIG. 34 above, it was assumed that the time taken by the f( ) calculation was similar to the time taken for the memory unit 32 to send the next data element. If the f( ) calculation is faster, this is not a significant problem. The CPU may perform another calculation (e.g. for another thread running on the CPU) or be idle. It will be triggered when the first data arrives into the data queue 33. The embodiment will be no slower than a traditionally designed computer system and perhaps a little faster because the CPU of the embodiment does not have to send many data addresses and the address calculation is parallel to the f( ) calculation task.

However, if the f( ) calculation is slower than the sending of data, the embodiment will be much faster than a known computer system, because the memory unit 32 can send the data continuously, so the CPU does not have wait between two iteration of the f( ) calculation and the address calculation will not be the work of CPU.

As explained above, the memory controller 34 sends the data over the bus 40 into the data queue 33. If the data queue 33 is not full, the process can continue. Just before the data queue 33 becomes full, the CPU 31 sends a PAUSE signal to the memory controller 34, which in response stops sending data (or begins instead to work for other processes, e.g. running on other CPUs/cores 31).

Some steps later, the CPU 31 will have used up some of the items stored in the data queue 33. Before (e.g. just before) the data queue 33 is emptied, the CPU 31 determines this and accordingly sends a START signal to the memory controller 34. The memory controller 34 recommences sending the previously requested data to the data queue 33.

The process will finish when the memory controller 34 sends a STOP signal, i.e. when there is no more data to send. The CPU 31 can continue computing the f( ) functions of data elements from the data queue 33, but when the data queue 33 is exhausted the calculation is finished and the process stops.

For this type of calculation it may be convenient for programmers to use a foreach loop.

Found Data: the STOP Signal

It is possible that the CPU 31 may want to abort the data reading operation. This may happen when the f( ) function determines that a value sent by the memory 32 or a value the CPU 31 has calculated meets a certain criterion and in response the CPU 31 makes a decision to abort the loop. One example of this is if the f( ) is a searching function and the CPU 31 finds the data which was sought. In this case the CPU 31 sends a STOP signal to the Memory Controller 34 to terminate the data sending.

Once this is done, the data queue 33 is emptied by the CPU 31 and the data schema data is removed from the memory controller 34.

Stream Data: PAUSE from the Memory Controller

It is possible that the CPU 31 may want to read a stream of data which the memory controller 34 cannot currently supply, e.g. because another thread is reading this data from the internet continuously (e.g. a video) and all of the stream has not yet reached the memory 35. In this case, the memory controller 34 reads whatever part of the stream is in the memory 35 and sends it to the data queue 33. Then the memory controller 34 awaits the arrival of the next data package into the memory 35. In meantime, the memory controller 34 sends the CPU 31 a PAUSE signal to inform the CPU 31 that the CPU 31 is free to perform other tasks. When it determines that the memory 35 has received more of the stream, the memory controller 34 may send a START signal to the CPU 31 to inform the CPU 31 that calculations can be continued.

Note that in order that the CPU 31 receives a data stream, the structure of the Data Reach Table the CPU 31 sends to the memory controller 34 is as follows:

ID
Mode: Read
Base Address
Attributes: FIFO
Data end: stream
Data Type: word
Data size: Size
Item Count: N 2.3 Multi Core/CPU/Thread Systems: Thread/CPU/Core ID In the previous examples there is only one CPU 31 with only one thread. However, modern systems are multi-threaded, so in the embodiment the data queue 33 is preferably more sophisticated, to ensure that each thread receives the correct data from the memory 35. In the conventional technology of FIG. 31, the CPU simply waits to receive any data which has been requested, so this is not hard to coordinate. By contrast, in the embodiment, every data package (including every data package sent by the memory controller 34 to the CPU 31) preferably has a header: a thread/CPU or core ID and a size. The ID of the thread/core/CPU is contained in the corresponding Data Reach Table.

This information may be transmitted in the address bus 42. Whereas, in the conventional technology the address bus is not bidirectional, in the embodiment the address bus 42 may contain the addressee ID of each data package sent by the memory unit 32. The data package is a memory package (a plurality of data elements with a defined order), so that the memory controller 34 can send complete lines together, which can speed up the data exchange.

This protocol may be optimized to minimize the sent data header in the data bus, while retaining sufficient information about the addressee thread to ensure that the thread receives the data. A switch may be provided in the CPU 31 to guide the data to the right cache or Data Queue.

Data Reach Table

The data reading example of FIG. 34 described the case that there is a single data set to read. We now describe how the embodiment uses the data queue 33 in the case that the CPU has to perform a function such as g(A[i], B[i]) based on two data sets stored in the memory 35 in respective memory areas A and B which have respective starting locations A[i] and B[i] and respectively composed of N(A) data elements which are each of size Size(A) and N(B) data elements which are each of size Size(B). The index i can take multiple values if, within each of the memory areas A and B there are multiple data elements (i.e. such that the function is g(A[i], B[i]) may alternatively be expressed as g(A[0],B[0]), g(A[1],B[1]), . . . ) so that the data which the memory controller 34 is to send to the data queue 33 is successively A[0], B[0], A[1], B[1], . . . .

In this case, the data reach table which the CPU 31 sends to the memory controller 34 is as follows; Data Reach Table
ID
[0]
Base Address (A)
Mode: Read
Attributes: array
Data end: count
Data Type: word
Data size: Size(A)
Item Count: N(A)
[1]
Base Address (B)
Mode: Read
Attributes: array
Data end: count
Data Type: word
Data size: Size(B)
Item Count: N(B)

This data reach table instructs the memory controller 34 to store more than one data set in the data queue 35, by alternately reading data elements from the two different memory areas A and B and sending the data elements to the data queue 35. The memory controller 34 preferably contains a special memory to store this data. It should be fast and it is preferable if it uses the same memory cell technology as the cache 23/data queue 33. The size of the records are fixed, so this data is an array of fixed size data items. For that reason, the memory controller 34 does not require a general memory, but can instead use a specialized register array.

The exact size of the register array may be selected by the designer of the memory controller 34. Increasing the size of the register array gives greater freedom, but increases the hardware production price.

Pointer Type

Figure 39:
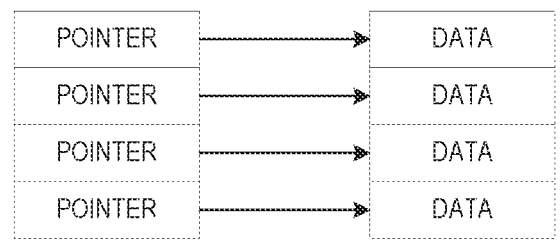
FIG. 39 illustrates an array of pointers.

One important type of data element is a pointer. FIG. 39 illustrates a pointer array in which every item points to a memory address. Pointers are commonly used to store classes or strings in the memory. In the conventional memory of FIG. 31, the array address calculation is fast, but reading any data from this array requires twice the time. In a first step the CPU instructs the memory to read an item from the array and the memory sends back that address to the CPU. In a second step, the CPU asks the memory for the data stored at the address and the memory sends it.

By contrast, the embodiment is preferably constructed such that the CPU 31 is operative to send a command to the memory controller 34 which specifies that a required item is a pointer and that instead of sending the CPU the pointer, the memory controller 34 should send the CPU 31 just the value which is stored at the memory address to which the pointer points. This halves the amount of data which has to be transmitted over the data bus, thereby removing a bottleneck of the known system of FIG. 31. (Additionally, the CPU 31 is operative to read the pointer itself from the memory unit 31, just like any other data, using a different sort of command which instructs the memory controller 34 to treat the pointer as a normal data word.)

The command which instructs the memory controller 34 to transmit to the CPU 31 the data stored at an address the pointer points to may use a data reach table with the following form.

```
ID
Base Address
Mode: Read
Attributes: array
Data end: count
Data size: Size
Item Count: N
Data Type: pointer
{
Data Type: Word
}
```

String Type

A string array may be a pointer array in which each pointer points to a string stored in the memory 35. For that reason, the way in which the embodiment handles read requests for string arrays is very similar to how it handles requests for data pointed to by pointer arrays. The only difference is how the end of each string is handled. There are various cases to consider.

Firstly, in the case of null terminated strings, the command sent by the CPU may instruct the memory controller 35 to keep copying data from locations pointed to by the pointer array until a pointer is reached which points to a character which is null. This sort of command may be implemented using a data reach table with the following form:

```
ID
Base Address
Mode: Read
Attributes: array
Data end: count
Data size: Size(pointer)
Item Count: N
Data Type: pointer
{
Data Type: String, EoD
}
```

Another conventional way for a compiler to store a string is as an array which begins with the length of the string, e.g. (6)ABCDEF where A, B, C, D, E and F are the six data element of the string. In this case, the data reach table may have the following form:

```
ID
Base Address
Mode: Read
Attributes: array
Data end: count
```

-continued

```
Data size: Size(pointer)
Item Count: N
Data Type: pointer
{
Data Type: Word, Length
Data Type: String, Count: Length
}
```

Part of Strings

In the case that the CPU 31 is performing a search for a string which has a certain property, it may be possible to speed up the search by the CPU 31 just instructing the memory unit 34 to send a part of each string specified by the string array. If this part of the string has the required property, then the CPU 31 may request that the rest of the sting is transmitted also.

For example, the following data reach table may be used as part of a command from the CPU 31 to the memory unit 34 which instructs the memory unit 34 to send the first 3 characters of each string in the string array:

```
ID
Base Address
Mode: Read
Attributes: array
Data end: count
Data size: Size(pointer)
Item Count: N
Data Type: pointer
{
Offset: 0
Data Size: 3
Data Type: String, EoD
}
```

In another example, the following data reach table may be used as part of a command from the CPU 31 to the memory unit 34 which instructs the memory unit 34 to send the first 3 characters of each string in the string array starting at the 5th character:

```
ID
Base Address
Mode: Read
Attributes: array
Data end: count
Data size: Size(pointer)
Item Count: N
Data Type: pointer
{
Offset: 5
Data Size: 3
Data Type: String, EoD
}
Class/structure handling
```

Classes and structures are important parts of the programming languages. The embodiment uses the following data structure in an array:

```
Structure S {
Integer X;
Integer Y;
String Z;
Integer W;
}
```

Suppose the CPU 31 needs to perform in a loop a function f which is a function of just the Z and W fields. We can denote this as f(S.Z, S.W). In this case, the memory controller 34 does not send the fields X and Y through the data bus.

The command sent by the CPU 31 to the memory controller 34 in this case may use the following data reach table:

```
ID
Base Address
Mode: Read
Attributes: array
Data end: count
Data size: Size(S)
Item Count: N
Data Type: pointer
{
  {
    Offset: 2 words // to jump over X and Y
    Data Size: variable // depends on the length of string
    Data Type: pointer
    {
      Data Type: String, EoD
    }
  }
  {
    Offset: 0 words // relative offset
    Data Type: word
  }
}
```

As can be seen, this data reach table allows pointers to be given a different meaning and a list of data to be extracted with different offsets.

Link Handling

The embodiment may additionally be operable in a case in which the structures contain pointers ("links") to memory addresses. This is a known data representation for linked lists or trees.

In the embodiment, the item structure may be the following.

```
Structure S {
    String Str;
    Pointer NextPtr;
}
ID
Mode: Read
Base Address
Attributes: link
Data end: EoD
Data Type: pointer
{
  {
    Data Type: pointer
    {
      Data Type: String, EoD
    }
  }
  {
    Data Type: pointer, Next
  }
}
```

In this case the memory controller 34 uses a register referred as a "Work Base Address register". The base address points to the beginning of the list (so the memory controller 34 can use it if it receives a RESTART signal). The memory controller 34 is instructed to read and send the string data to the data bus, but the next item will be set by the Data which set by the Next attribute. It is important the block reading is sequential, so after a variable with Next attribute, the record will be set to the next item in the list.

Data Writing FIG. 34 explained an operation for reading data from the memory 35. Here we explain how the memory controller 34 handles a data writing operation.

The CPU 31 sends a write command to the memory controller 34 using a data reach table to inform the memory controller 34 what it should do with the sent data in the data bus.

So in the first step the CPU sends a description of the data (e.g. individual data items or values forming a multi-dimensional array) and after that pushes the values into the data bus. The data reach table has the following format:

ID
Mode: Write
Base Address
Attributes: array
Data end: EoD
Data Type: word

Upon receiving this command and the data from the data bus, the CPU 31 runs the following code to transmit the data to the memory 35 through the data bus 34:

```
Integer[N] A;
Int i = 0;
foreach(A, while i < N)
{
  A[ ] = i;
  i = i + 1;
}
```

Thus, in this case it is the caller's (CPU's) responsibility to ensure that all the memory addresses are correct (i.e. within the memory space defined by the memory 35). The Data end may be a number, or the CPU may terminate the write operation by sending the memory controller 34 a STOP signal.

Alternatively, it is possible for the CPU 31 to send the memory controller 34 another form of the data reach table, which instructs the memory controller 34 to take responsibility for ensuring that the data is written to extant addresses in the memory space:

ID
Mode: Write
Base Address
Attributes: array
Data end: number
Data Type: word
Item Count: N In this case the Memory Controller will wait for the N data and step by step copy the sent values into the memory space locations. In this case also, the CPU can terminate the writing operation by transmitting a STOP signal to the memory controller.

To allow freedom for the timing with which the data is sent to the data bus, it is preferably for the memory controller 34 to contain a data queue as well. This may have the same construction as the data queue 33.

Simultaneous Reading and Writing

The following example explains how the embodiment can perform simultaneous reading and writing. The algorithm is the following:

foreach(A)
    B[ ]=f(A[ ])

This means that the CPU 31 has to instruct the memory controller 34 to send all of the items of the A array and when a data element arrives at the memory unit 32 on the data bus the memory controller 34 should store it in the B array.

The command the CPU 31 sends may employ the following data reach table:

ID
Mode: Read
Base Address (A)
Attributes: array
Data end: number
Data Type: word
Item Count: N
ID
Mode: Write
Base Address (B)
Attributes: array
Data end: number/EoD
Data Type: word
Item Count: N Upon receiving this command, the memory controller 34 will send the requested data over the data bus to the data queue 33, the CPU 31 will read it from the data queue 33, do the f( ) calculation and send back the result to the memory controller which writes it into the memory 35.

Neighbourhood Matrixes

Figure 40:
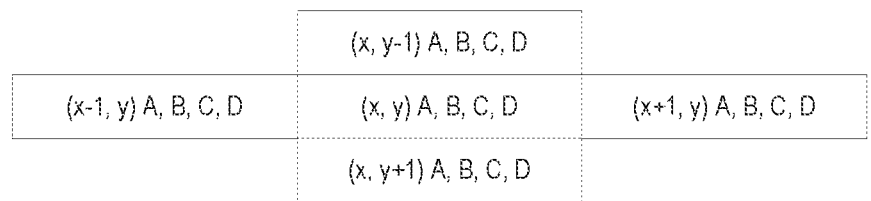
FIG. 40 illustrates a calculation which can be performed using the embodiment.

Many common programming tasks for modelling require the calculation values from the state of a data item and its neighbours. This is illustrated in FIG. 40.

The algorithm performed by the CPU 31 in this programming task is the following:

```
Item
{
Float A;
Float B;
Float C;
Float D;
}
Item[N, M] MatrixT;
Item[N, M] MatrixT1;
for(i: 1 -> N-1)
for(j: 1 -> M-1)
MatrixT1[i, j] = f(Matrix[i, j,], Matrix[i-1, j], Matrix[i, j-1],
Matrix[i+1, j], Matrix[i, j+1])
```

In this case the embodiment may use the 'Memory area cache' solution, in which the memory controller 34 is commanded by the CPU 31 to transmit requested data directly to the cache 23. The CPU 31 can generate and transmit to the memory controller 34 data schemas having the following data reach tables, to respectively read and write 3×3 memory areas, such as the one illustrated in FIG. 41(*a*) and referred to as the "memory view window". This causes the cache 23 to mirror a part of the main memory 35.

ID-T
Base Address
Mode: Read/Neighbours
Attributes: array
Data end: count
Data size: Size
Item Count: M
Step: 3
Data Type: array
{
Attributes: array
Data end: count
Data size: Size
Item Count: N
Data Type: array
Step: 3
Data Type: Word -continued Data Type: Word
Data Type: Word
Data Type: Word
}
ID-T1
Base Address
Mode: Write/Neighbours
Attributes: array
Data end: count
Data size: Size
Item Count: M
Step: 3
Data Type: array
{
Attributes: array
Data end: count
Data size: Size
Item Count: N
Data Type: array
Step: 3
Data Type: Word
Data Type: Word
Data Type: Word
Data Type: Word
}

Note that in a higher dimensionality, the view window size may be different. For example, the view window may be 10×3. In this case the two values of "Step" which are defined in the data schema above in each of the two lines which immediately follow the setting of M, are both set to 10 not 3.

Furthermore, it is not necessary for ID-T (the data reach table for reading) and ID-T1 (the data reach table for writing) to have the same values of the various parameters. For example, they may be different such that a read command is performed on a first memory view window and a write command is just performed for a second view window which is a sub-set of the first memory view window.

The CPU could set the memory view window with the following instruction:

STEP DimensionNumber, Step

After this instruction the starting and ending position will be changed in the memory controller. The dimension is 0 or 1 in our case for row or columns respectively and the step is e.g. 1 for the next row or/column in the area, or −1 for the previous row/column, but with STEP 0, 3 we could move to the next 3×3 box.

The memory controller will send the missing items in order, or in the next writing it will overwrite them. The reading and writing schemas are separated, so they can be used in different ways. In some cases (e.g. exceptional cases) the shifting can be handled easily, but the use of a shift memory (as discussed above) may help improve the speed of the operation.

Figure 41:
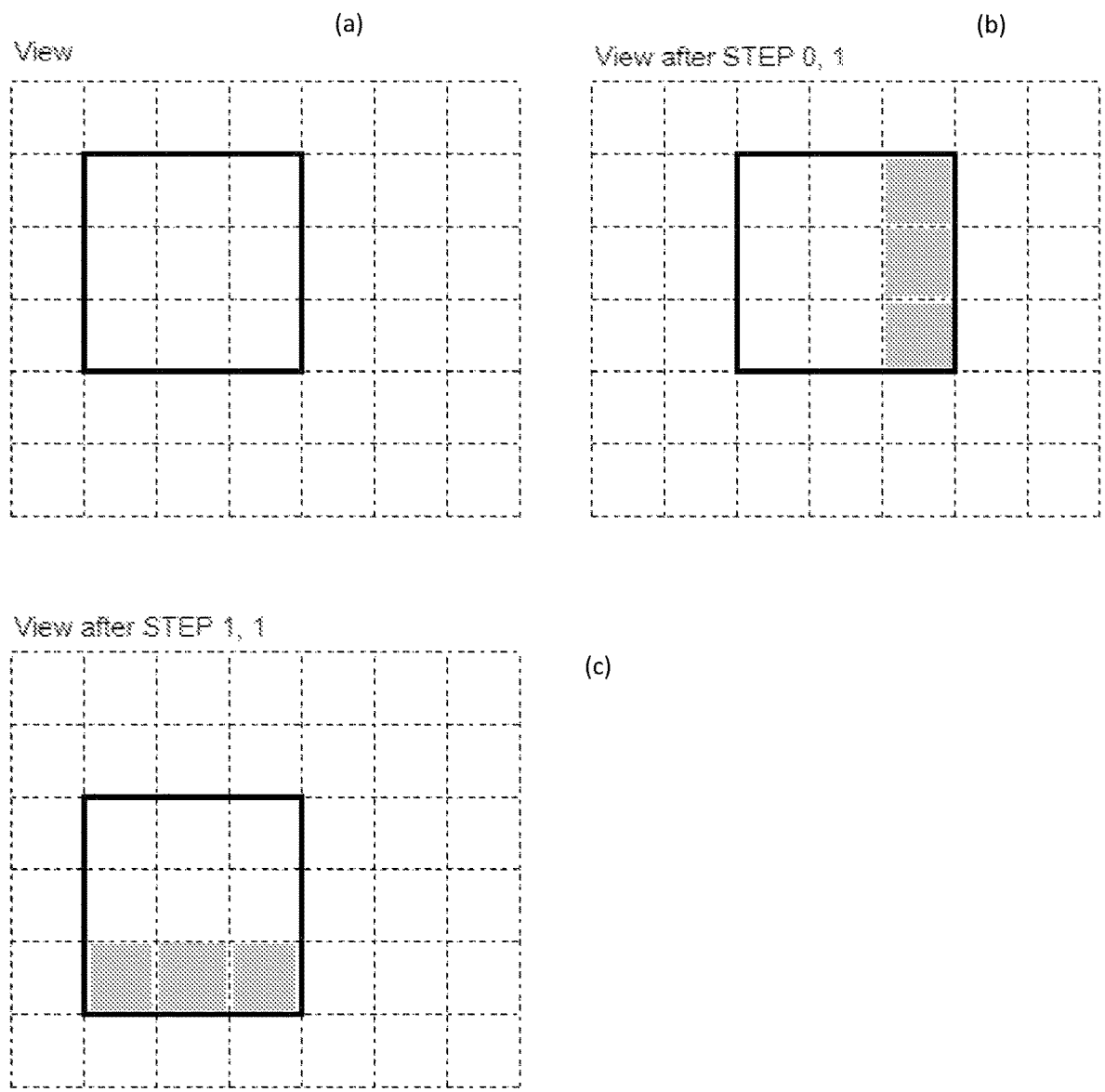
FIG. 41, which is composed of FIGS. 12(a), 12(b) and 12(c), illustrates an operation of shifting data in a memory.

Note that the memory view window is movable in the cache. FIG. 41(*a*) is a schematic initial view. FIG. 41(*b*) is a view after STEP 0,1—this is a step to the right as viewed in FIG. 41(*a*). FIG. 41(*c*) is a view after step 1,1—this is a step down as viewed in FIG. 41(*a*).

The gray cells will be sent using the data bus to the CPU (reading), or will be rewritten when the CPU sends them to the data bus (writing).

In the actual infrastructure cache, if a line is long enough it will be wiped out when the loop goes through the array, so every item will be read from the memory three times: when we calculate its value in the actual line and when we calculate the previous and next line.

In the embodiment the cells will be read once when the calculation goes through the area. The shifting and stepping operations will handle the multiple data usage.

3. Variants of the Embodiment

Many variants of the embodiment are possible within the scope of the invention defined by the appended claims, as will be clear to a skilled reader, including the following possibilities.

Multi-Threading

The memory controller 34 may be adapted to handle instructions from more than one thread/process/CPU at the same time. As noted above, each command itself includes a data schema which has a unique ID for the thread/process/CPU and the memory controller 34 stores them in an array. When the memory controller 34 changes from implementing one command to implementing another (i.e. the sending stream is changed), the memory controller transmits an ID of the new command to the CPU(s). Based on this, the CPU to which the new stream is directed can copy the data into its cache 23.

Figure 42:
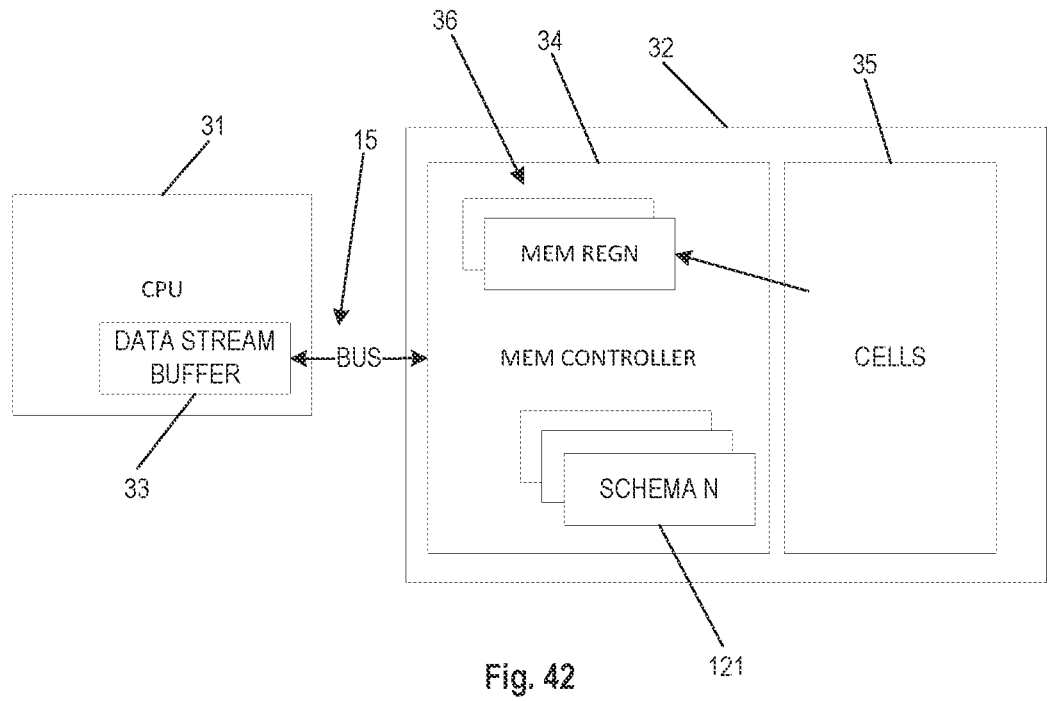
FIG. 42 illustrates a variant of the embodiment of FIG. 33.

This is illustrated in FIG. 42, where the memory controller 34 is shown as storing multiple schema 121, for respective threads/processes/CPUs. One of the CPUs 31 is illustrated, but there may be multiple CPUs 31 connected to the memory unit 32, e.g. over the same bus 40.

Similarly, when the CPU(s)/thread(s)/process(es) are writing data (transmitted over data bus 43) to the memory unit 31, the CPU(s)/thread(s)/process(es) inform the memory controller 34 which data schema should be used to handle the data. The memory controller 34 writes the data into the portion of the memory 35 which is specified by the data reach table of the data schema which the CPU(s)/thread(s)/process(es) indicate. For the best performance, the data schema should not be changed during the writing process.

Multi CPUs Systems with More Memory Controller

In a variant of the embodiment, the memory unit includes more than one memory controller 34. Each memory controller (which may have the same structure as the memory controller 34 of the embodiment) is able to write to and read from the same memory module of the memory unit. Each of the memory controllers may be connected to a respective bus, which allows two-way data traffic with a respective group of one or more CPUs. Thus, in this variant of the embodiment, multiple CPUs can use the same memory via different data buses. This variant has the advantage that even though the overall computer system includes multiple CPUs, there is less likelihood of the locking problem occurring, since the registers of each memory controller (i.e. the registers which are equivalent to the registers 36 of the memory controller 34), are not shared between so many CPUs.

Pipeline, Calculation Waves for Integrated CPU and Memory

Other variants of the embodiment are a pipeline system, a matrix system, or a system with a dimensionality greater than two. Such a system includes multiple memory areas which are arranged in an array (i.e. a one-dimensional array in the case of a pipeline; or a two-dimensional array in the case of a matrix; or a higher dimensional array). The system also includes multiple CPUs and respective memory controllers. The memory controllers are arranged to perform read/write operations to a plurality of neighbouring ones of the memory areas. The connections between each CPU and the respective memory controller and the corresponding memory areas may be implemented by respective circuitry, or it may be implemented logically with the various memory areas being logically-defined sections of a common memory.

Figure 43:
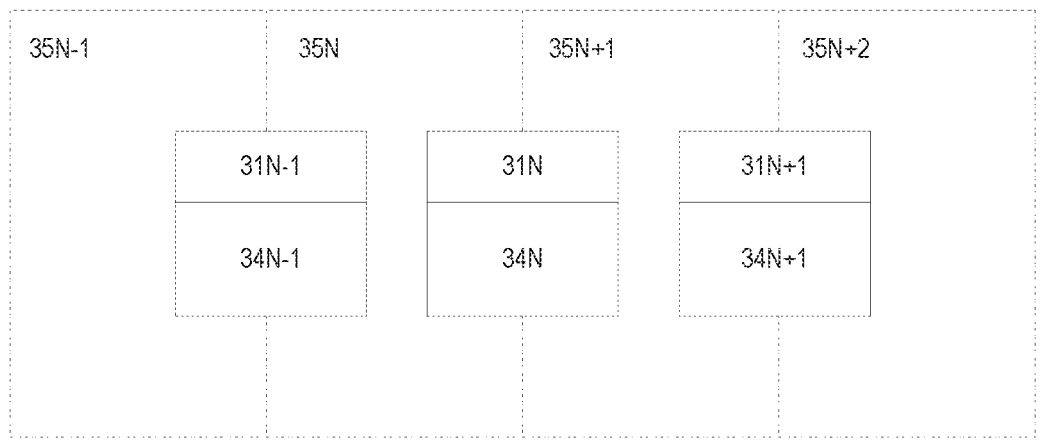
FIG. 43 illustrates another variant of the embodiment of FIG. 33.

FIG. 43 illustrates a pipeline system which is a physical or logical structure, including memory areas labelled 35N−1, 35N, 35N+1 and 35N+2. These are to be understood as part of a chain of memory areas including any number of memory areas greater than 3, extending to the left and right of the part of the chain shown in FIG. 43. Three CPUs of the pipeline system are labelled 31N−1, 31N and 31N+1 and the respective memory controllers are labelled 34N−1, 34N and 34N+1. The three memory controllers 34N−1, 34N and 34N+1 are arranged to read/write data to respectively to both of: the pair of memory areas 35N−1, 35N; the pair of memory areas 35N, 35N+1; and the pair of memory areas 35N+1, 35N+2.

With this pipeline structure, any CPU (e.g. the CPU 31N) can use the output of the neighbouring CPU (e.g. the results from CPU 31N−1) which is stored in their shared memory area 35N and can create data to be used by another neighbouring CPU (e.g. the CPU 31N+1) in their shared memory area 35N+1. This allows a "calculation wave", in which a computational problem is solved by successive operations by the respective CPUs as data flows, for example, from left to right across FIG. 43. The separate memory controllers help their respective CPUs and solve the locking problems in the shared memory. This scheme can straightforwardly be generalised to 3-or-more dimensional arrays of memory areas, in which the memory areas form a regular array with translational symmetry along 3-or-more axes. For example, a CPU and respective memory controller can be provided for any pair of neighbouring memory areas which are spaced apart along one of the axes. Such a computer system may be very useful for AI systems or area simulation projects.

Multi Cored CPU Systems

In another variant of the embodiment, the CPU 31 may be provided with more than one core. Each of the cores may share the same cache area 23 in the CPU 31 and the same data queue 33. For example, the cores may pick alternate data items from the data queue 33. Such a system is typically faster than a conventional system in which the CPU has multiple cores.

Multi Memory Bank Systems

Figure 44:
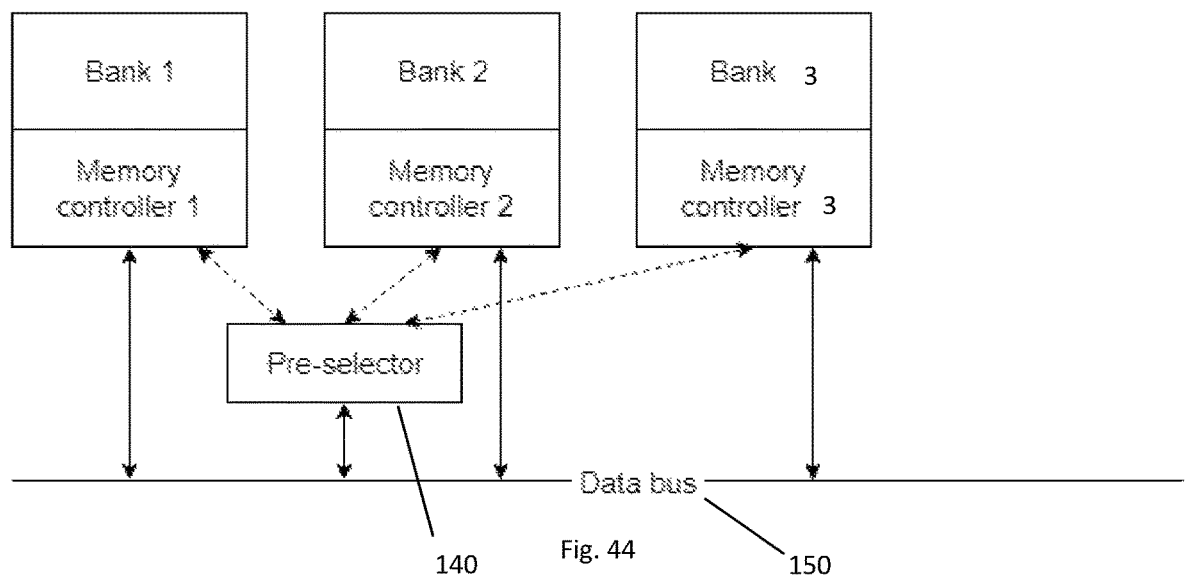
FIG. 44 illustrates a third variant of the embodiment of FIG. 33.

FIG. 44 illustrates another variant of the embodiment in which the memory 35 is divided into multiple banks (shown as Bank 1, Bank 2 and Bank 3). Each bank is provided with a respective memory controller (shown as Memory controller 1, Memory controller 2 and Memory Controller 3. A pre-selector circuit 140 may be provided to decide, given a memory address in a received instruction, which bank contains that address and pass the instruction to the corresponding memory controller. Note that this reduces the chance of a bottleneck if multiple instructions are received.

Hierarchical Memory

Another similar way to avoid a bottleneck between the memory controller 34 and the memory 35, to implement the memory controller 34 with a hierarchical structure. The structure includes a "master" unit (similar to the pre-selector of FIG. 44) and one or more slave memory controller units (similar to the three memory controllers of FIG. 44). Optionally, one or more of these slave memory controller units may similarly act as the master to a corresponding set of one or more slave memory controller units which form a second level. This hierarchical pattern may be repeated for multiple levels. At the lowest level, the memory controllers are responsible for different respective parts of the memory 35 and each master is responsible for the sum of the parts of the memory for which its slaves are responsible. At each level, a master separates the tasks it receives among its slave memory controllers according to which part(s) of the memory each task relates to.

Communication Between Memory Controllers

Note that in any of the variants of the embodiment described above in which there are multiple memory controllers, the memory controllers may optionally be arranged to communicate directly. This makes it possible to solve locking problems and perform other special functions.

Special Functions in the Memory Controller

The explanation of the embodiment explained that the memory controller 34 is operative to perform various commands. Optionally, the memory controller 34 may have additional functionality, especially relating to other simple functions. This additional functionality would preferably be controlled by the CPU 31 sending instructions to the memory controller 34.

For example, the memory controller 34 may be operative after it has received and performed an instruction relating to a pointer, to change the pointer's value (e.g. to change the string value of a string pointed to by the pointer, or to perform garbage collection) and/or to increase and/or decrease integer values stored in memory addresses (e.g. to increase or decrease an index and/or a size after performing an operation of inserting or removing data elements) and/or to perform logical functions (e.g. AND, OR) of integer values. Providing this functionality, especially in a hard-wired manner, would speed up a search in the memory 35 for data items having a certain property. Similarly, providing the memory controller 34 with the functionality (e.g. implemented in hardware) to create a hash key would be useful when if the computer system is required to perform a hash based storage problem.

For that functionality the CPU could send instructions for the controller.

Data Queue Structure

The data queue 33 may be implemented in various ways. One way would be as a list with a head and end pointer. Alternatively, it may be implemented using a shift memory as discussed above. The functionality should preferably solve the following problems:

the data queue 33 should preferably be capable of indicating a "next" data element among the data elements it is storing.

the data queue 33 should preferably be capable of indicating the number of data elements it is currently storing (e.g. as measured as a number of words)

the data queue 33 should preferably be capable of indicating the position in the data queue of the end of the data it is storing.

the data queue 33 should preferably be capable of indicating when it is empty the data queue 33 should preferably be capable of clearing all the data stored within it in response to a command from another portion of the CPU 31.

Shift Memory

In a further variation of the embodiment, the memory unit 32 may be implemented as a "shift memory", which is operative to receive a command from the CPU which causes the memory unit 32 to move data from one location in the memory space 35 to another location in the memory space. Optionally, the memory 35 may be partitioned into groups of one more memory cells and the memory controller 34 may comprise buffer elements which are directly connected by wired data paths to respective ones of the groups of memory cells, such that data can be written between the buffer elements and the memory cells.

4. Summary of the Advantages of the Embodiments Discussed Above

1. When writing multiple data element items to the memory, each CPU 31 is not required to calculate addresses in a loop again and again. 2. If the programmers (or compiler) know the calculation will go through all of the items they can use this knowledge without sophisticated cache optimization algorithms. 3. It is not necessary to transmit to the memory an address for each data element. Instead, a single base address is sent at the beginning of a read/write operation. 4. It is not necessary to send a read/write command for each data element. Instead, a command relevant to a large number of successive data items is sent in the data schema, so only the data will be moved through the data bus. 5. The CPUs code cache is more efficient. 6. Pipeline solutions can be more effective. 7. The embodiment requires fewer stack and register instructions for the CPU to implement the same code, so the expensive CPU can concentrate on performing the real algorithm. 8. The registers of the CPU are not used for address calculation, so the running code will be easier to optimize. 9. The embodiment does not read waste data in classes/structures when data is fetched. 10. It is not necessary to move pointers to the CPU in order to read data stored at locations the pointer points to. This may be true even in the case that the memory stores a chain of pointers of any length with all but the last one pointing to a successive pointer. Thus, the embodiment enables efficient handling of classes, structure and strings, which are important parts of modern programming languages. 11. The compilers will have an easier task than in a conventional system, because the programmer could inform it directly about the loop the CPU is required to perform and the optimizer is not required to understand the process. 12. The embodiment makes it possible to modify strings stored in the memory. 13. In embodiments in which the memory controller 34 is able to retrieve data elements from the memory 35 at locations which are pointed to by other data elements in the memory 35, this functionality may make it unnecessary to transfer pointer values through the bus when a function of the data elements is to calculated, so the function calculation can be faster. 14. In a conventional system, because of memory locking a slow thread may slow down other threads. However, since the embodiment provides faster the data exchange, there is less risk of the slowest algorithm slowing down the others, so the overall CPU efficiency will be higher. 15. The memory controller 34 may perform address calculation using optimized hardware. Since a general processor is not needed for this specialised calculation, the memory controller can be made much faster. 16. In preferred embodiments, multiple portions of the memory controller 34 can, in parallel, perform respective address calculations. This is easiest to implement if a field programmable gate array (FPGA) is used to perform each address calculation, since FPGA processes can be straightforwardly configured to run in parallel. 17. The memory controller 34 knows the data number of the data items, so, in certain embodiments of the invention, it is configured to be able to remove or add items during performance of a loop (a FOREACH loop) in which data is read from/written to an array of data elements. The memory controller 34 may continue to perform the FOREACH loop, while the controller makes any required change to the counters and size in the background. A shift memory could do that in one step. Because of this functionality of the memory controller 34, the data structures may be considered as dynamic in the loops as well. Note that this freedom is not present in a conventional system, in which the compiler is not able to modify a FOREACH loop it is currently processing. 18. With a shift memory the controller could reach all of the memory cells directly, which is much faster than a data bus.

The invention claimed is:

1. A memory circuit for a computer system, the memory circuit comprising:
    physical memory cells arranged to implement a plurality of corresponding locations for storing respective data elements, the memory circuit defining a logical memory space including a plurality of said locations arranged in an array, the locations of the memory space having respective logical addresses in the array based on the respective index values of one or more index variables;
    the memory circuit being operative to:
        upon receiving a read command including a read address in the memory space, transmit out of the memory unit circuit, data stored at the read address;
        upon receiving a write command including:
            a write address in the memory space; and
            one or more data elements, write the data elements to locations at the write address; and
        upon receiving a shift command including shift data which indicates a source address in the memory space, perform a shift function comprising:
            using the source address to identify a portion of the memory space; and
            writing the data stored in the identified portion of memory space to a different location in the memory space;
        wherein for one or more pairs of said locations, a respective data pipe is provided as circuitry between the memory cells implementing the pair of the locations, the shift function being performed by at least one step of copying data from first ones of said locations to second ones of said locations which are respectively connected to the first locations by the respective data pipes;
        wherein the locations further include buffer locations which collectively constitute a buffer, each buffer location being associated with a respective group of the locations of the memory space and being connected by a respective said data pipe to at least one of the respective group of locations; and
        wherein each location of the memory space sets the value stored in a corresponding buffer location, or alternately each location of the memory space stores the value in the corresponding buffer location.

2. The memory circuit according to claim 1 which the one or more index variables include a primary index variable and the memory circuit is operative to, upon the receiving the shift command:
    identify the portion of the memory space as a plurality of locations, the plurality of locations comprising at least one sequence of plural said locations having consecutive values of a primary index variable and the same value of any index variable other than the primary index variable; and
    write the data stored by the identified plurality of locations to different locations within the memory space, wherein data stored at identified locations is written to respective locations which are spaced apart in the same order in the primary index direction.

3. The memory circuit according to claim 2 in which the source address is the address of a location at one end of one said sequence.

4. The memory unit circuit according to claim 1, in which the shift data further includes supplementary data specifying:
    an amount of data which is to be moved; and/or
    the different location in the memory space.

5. The memory circuit according to claim 1 in which the data pipes are operative to transfer data selectively in both directions between the respective pair of locations.

6. The memory circuit according to claim 5, in which said data pipes are provided connecting the buffer locations pairwise, so as to define a row of buffer locations, whereby data can be transferred successively along the row of buffer locations using the data pipes.

7. The memory circuit according to claim 1 which is operative to perform a shift function of transferring data simultaneously from a plurality of source locations and a plurality of respective target locations along respective data pipes which connect the respective source locations to the respective target locations, source cells and the target cells overlapping.

8. The memory circuit according to claim 1 which is operative to perform a shift function of transferring data from a plurality of source locations to a plurality of respective target locations along respective data pipes which connect the respective source locations to the target locations, wherein the memory circuit is operative to perform the shift function as successive steps of transferring data from successive ones of the source locations to corresponding ones of target locations along the respective pipes.

9. The memory circuit according to claim 1 in which the memory circuit is operative to perform refresh operations for the locations of the memory space using the buffer locations.

10. The memory unit circuit according to claim 1 in which each buffer location is connected by ones of said data pipes to at least two the respective group of said locations which are in different rows.

11. The memory circuit according to claim 1 in which respective locations in the memory space are connected by additional data pipes to respective locations in cache memory of a processor unit.

12. The memory circuit according to claim 1 which is additionally operative to receive and recognise a fill command in a pre-defined format, the fill command containing fill data specifying a portion of the memory space and a value and the memory circuit being operative to write the specified value into each location in the specified portion of the memory space.

13. A computer system comprising:
    at least one memory circuit comprising physical memory cells arranged to implement a plurality of corresponding locations for storing respective data elements, the memory circuit defining a logical memory space including a plurality of said locations arranged in an array, the locations of the memory space having respective logical addresses in the array based on the respective index values of one or more index variables; and
    the memory circuit being operative to:
        upon receiving a read command including a read address in the memory space, transmit out of the memory circuit, data stored at the read address;
        upon receiving a write command including:
            a write address in the memory space;, and
            one or more data elements, write the data elements to locations at the write address; and upon receiving a shift command including shift data which indicates a source address in the memory space, perform a shift function comprising:

using the source address to identify a portion of the memory space; and writing the data stored in the identified portion of the memory space to a different location in the memory space;

wherein for one or more pairs of said locations, a respective data pipe is provided as circuitry between the memory cells implementing the pair of the locations, the shift function being performed by at least one step of copying data from first ones of said locations to second ones of said locations which are respectively connected to the first locations by the respective data pipes;

wherein the locations further include buffer locations which collectively constitute a buffer, each buffer location being associated with a respective group of the locations of the memory space and being connected by a respective said data pipe to at least one of the respective group of locations;

wherein each location of the memory space sets the value stored in a corresponding buffer location, or alternately each location of the memory space stores the value in the corresponding buffer location;

at least one processing circuit operative to generate said read command, write command and shift command; and a bus for transmitting the read command, write command and shift command from the at least one processing circuit to the memory circuit and for transmitting data output by the memory circuit upon receiving a read command to the corresponding at least one processing circuit.

14. The computer system according to claim 13, in which the processing circuit is arranged to process data in units of words, each word comprising a plurality of bits and each location is arranged to store an amount of data equal to one said word.

15. The computer system according to claim 13, in which the processing circuit is operative to perform a garbage collection operation by transferring shift commands to the memory circuit.

16. The computer system according to claim 13, in which there are a plurality of said memory circuits which are arranged to define a collective memory space.

17. A method for operating a memory circuit comprising physical memory cells arranged to implement a plurality of corresponding locations for storing respective data elements, the memory circuit defining a logical memory space including a plurality of said locations arranged in an array, the locations of the memory space having respective logical addresses in the array based on the respective index values of one or more index variables, the method comprising:

receiving a shift command including shift data which indicates a source address in the memory space; and performing a shift function comprising:

using the source address to identify a portion of data in the memory space; and writing that portion of data to a different location;

wherein for one or more pairs of said locations, a respective data pipe is provided as circuitry between the memory cells implementing the pair of the locations, the shift function being performed by at least one step of copying data from first ones of said locations to second ones of said locations which are respectively connected to the first locations by the respective data pipes;

wherein the locations further include buffer locations which collectively constitute a buffer, each buffer location being associated with a respective group of the locations of the memory space and being connected by a respective said data pipe to at least one of the respective group of locations; and wherein each location of the memory space sets the value stored in a corresponding buffer location, or alternately each location of the memory space stores the value in the corresponding buffer location.

\* \* \* \* \*